(12) United States Patent
Yokota et al.

(10) Patent No.: US 6,640,185 B2
(45) Date of Patent: Oct. 28, 2003

(54) DISPLAY METHOD AND APPARATUS FOR NAVIGATION SYSTEM

(75) Inventors: Tatsuo Yokota, Torrance, CA (US); Micchael Clark, North Hollywood, CA (US)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 09/909,768

(22) Filed: Jul. 21, 2001

(65) Prior Publication Data

US 2003/0018427 A1 Jan. 23, 2003

(51) Int. Cl.⁷ .............................................. G01C 21/30
(52) U.S. Cl. ........................ 701/208; 701/212; 340/995; 345/684
(58) Field of Search ................................ 701/200, 208, 701/211, 212; 340/990, 995; 345/684, 472

(56) References Cited

U.S. PATENT DOCUMENTS

| | | | |
|---|---|---|---|
| 5,617,319 A | 4/1997 | Arakawa et al. | |
| 5,852,791 A | 12/1998 | Sato et al. | |
| 6,321,158 B1 * | 11/2001 | DeLorme et al. | 340/995 |

* cited by examiner

*Primary Examiner*—Thomas G. Black
*Assistant Examiner*—Arthur D. Donnelly
(74) *Attorney, Agent, or Firm*—Muramatsu & Associates

(57) ABSTRACT

A display method and apparatus for navigation system for displaying information for guiding a driver of a vehicle. The navigation system designed to achieve an easy and efficient operation by a user for displaying information or changing displayed images with use of a substantially simplified set of control keys. In he navigation system, an enter (selection) key functions not only to set and select a menu but also to switch between a p screen and a map zoom screen. Cursor (scroll) keys function not only to scroll a map image in the map screen but also to adjust a zoom scale of the map image in the ma zoom screen.

36 Claims, 23 Drawing Sheets

Fig. 2A
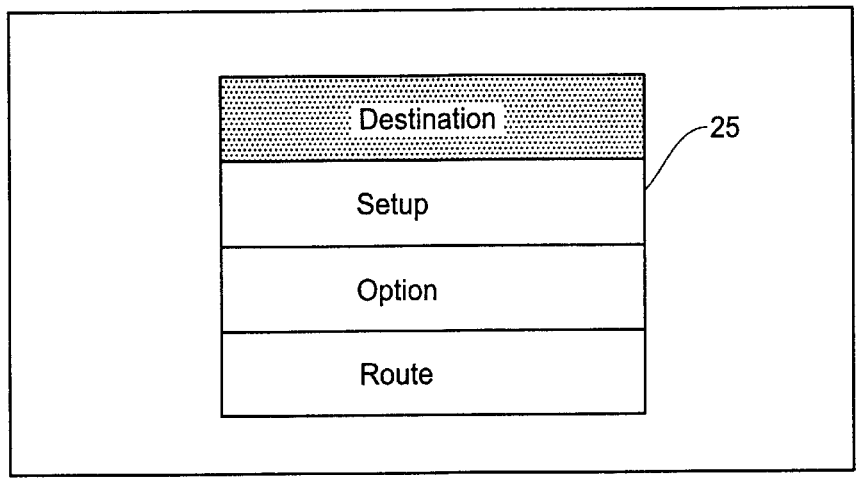
Fig. 2B
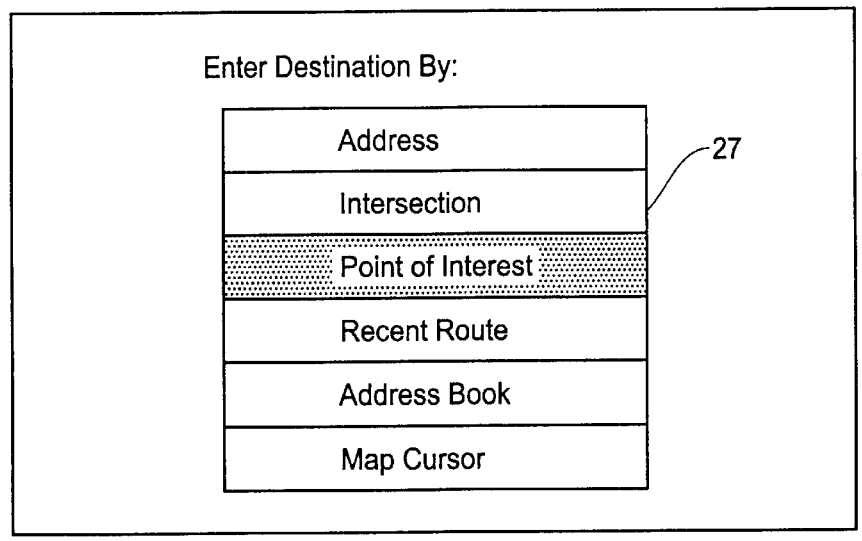
Fig. 2C
| Category List | 28 |
|---|---|
| Recreation | Input Category |
| Bank | Hotel |
| Emergency | Gas Station |
| Restaurant | Shopping |
| Travel | Automotive |
| Park | Theater |

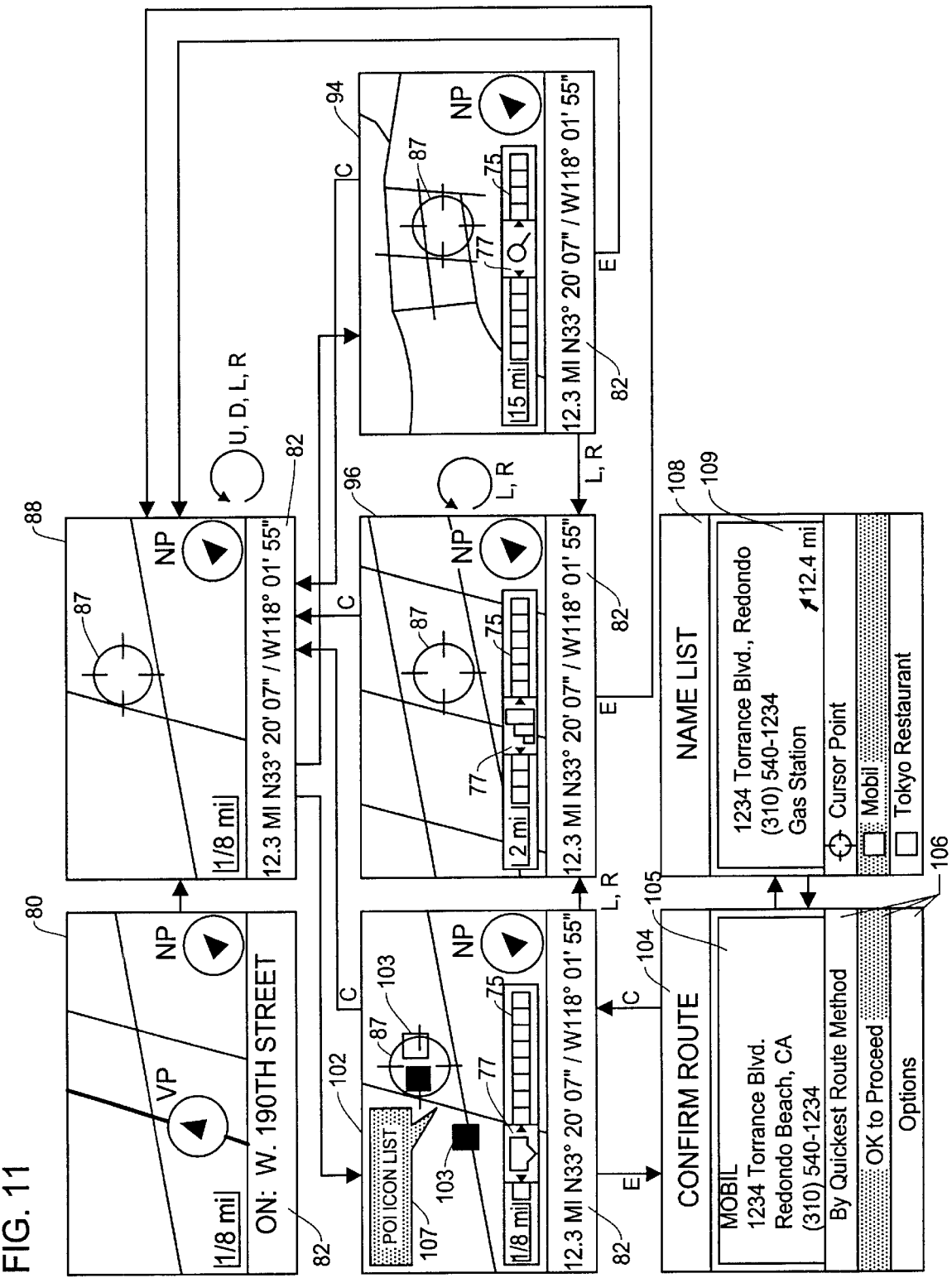

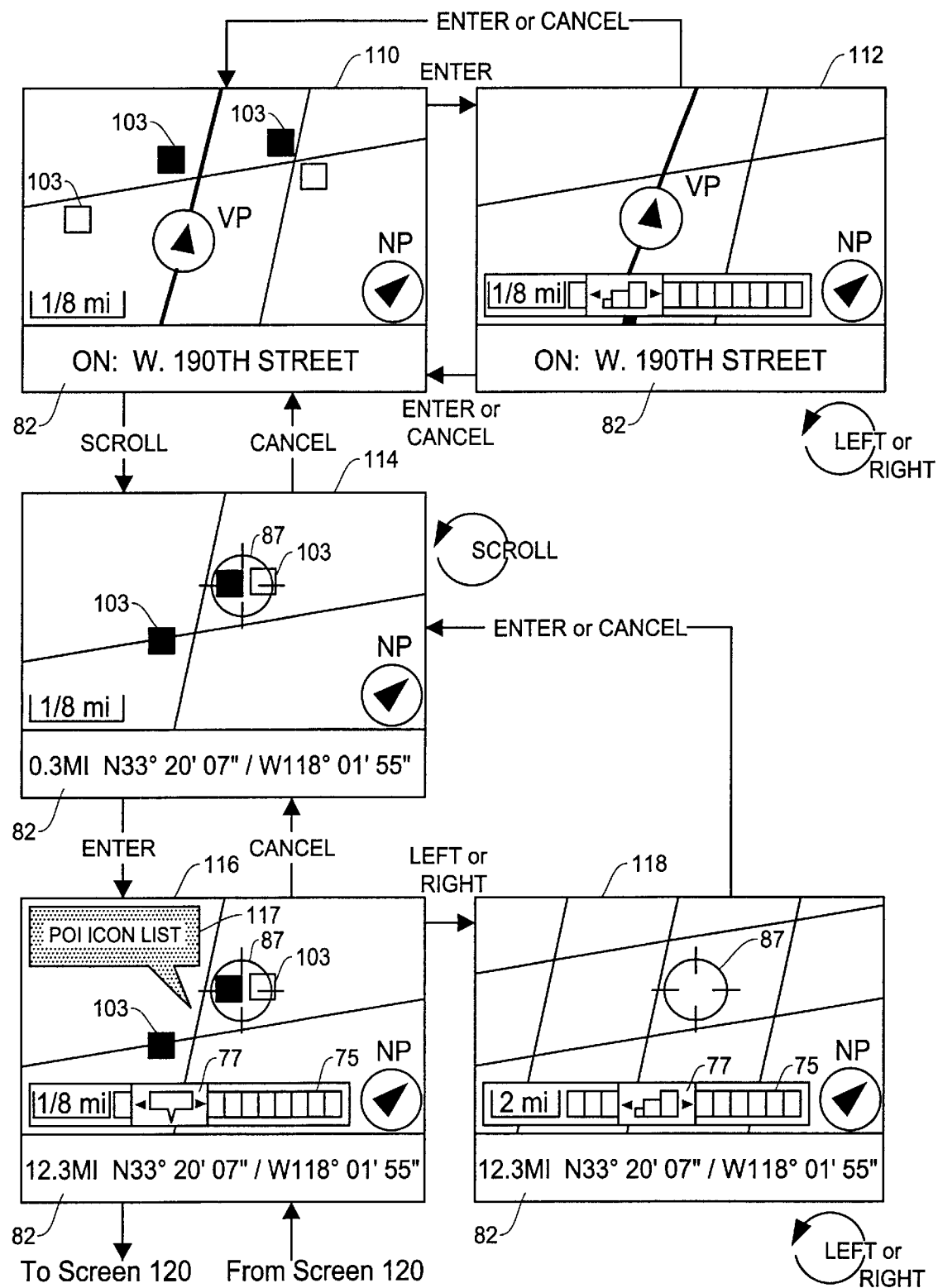

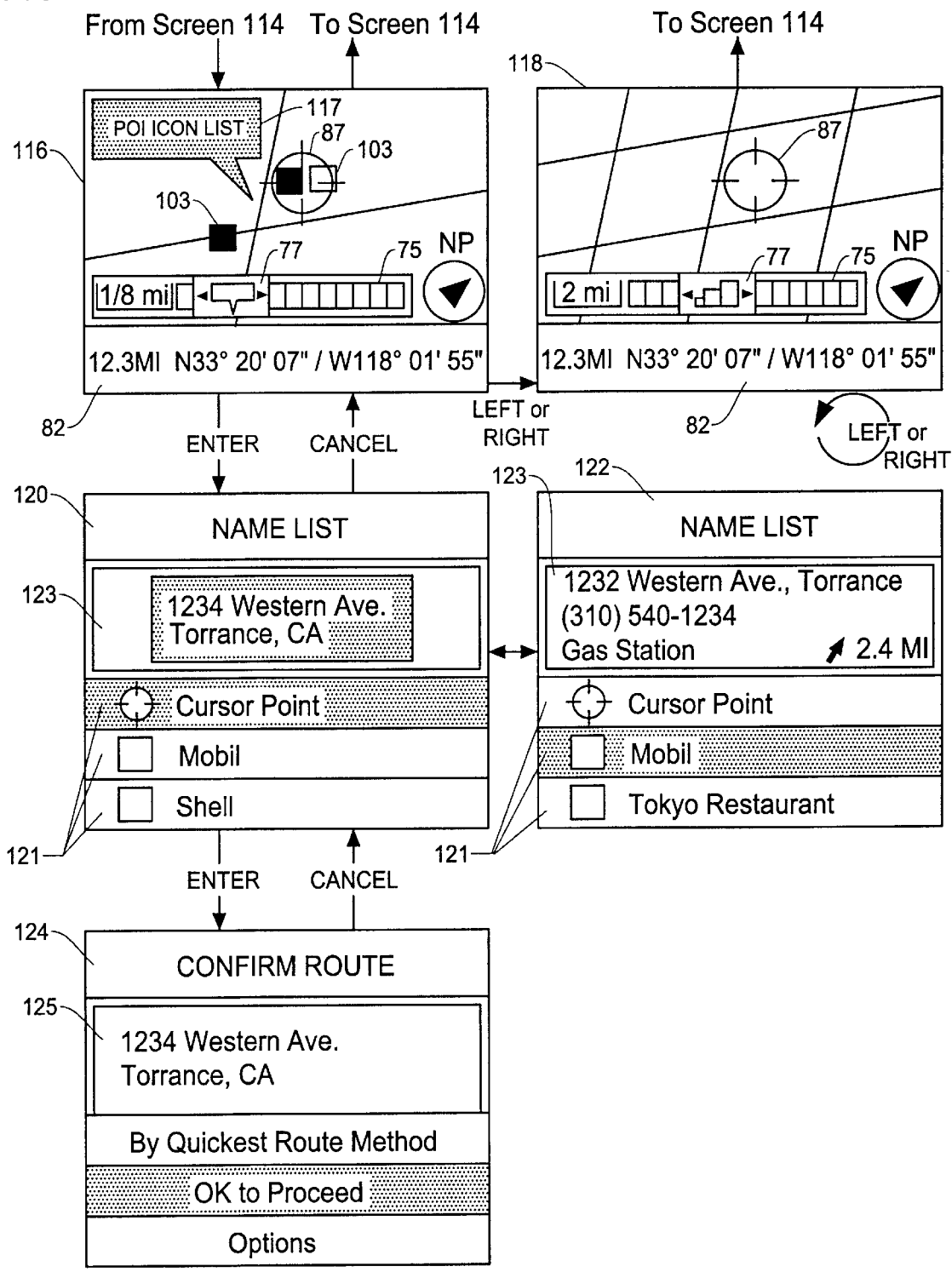

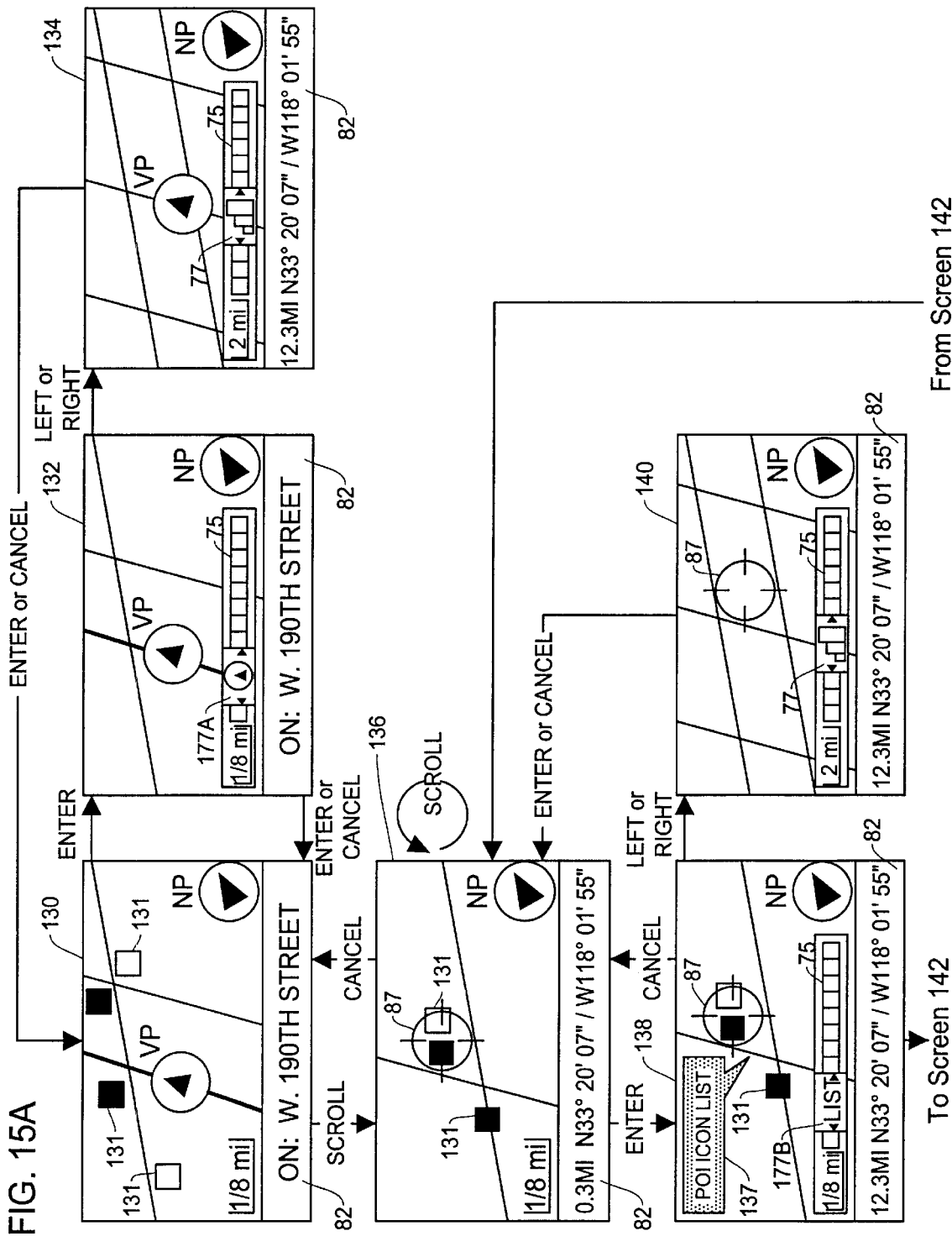

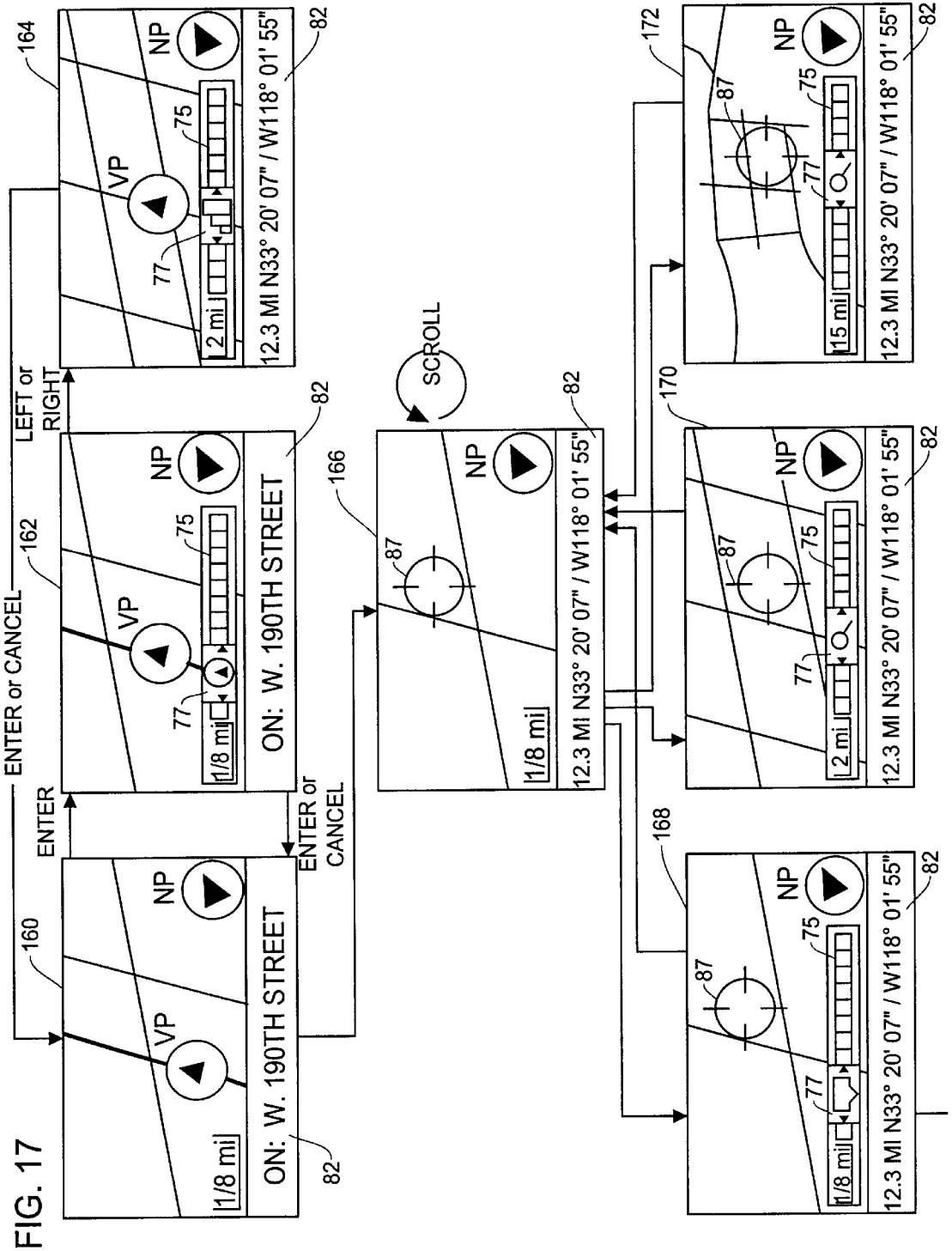

DISPLAY METHOD AND APPARATUS FOR NAVIGATION SYSTEM

FIELD OF THE INVENTION

This invention relates to a display method and apparatus for navigation system for displaying information involved in guiding a driver of a vehicle, and more particularly, to a display method and apparatus for navigation system for displaying various kinds of screens and controlling the operation of the navigation system with use of a limited number of control keys.

BACKGROUND OF THE INVENTION

A vehicle navigation system performs vehicle travel guidance enabling a driver to easily drive the vehicle to a selected destination. Such a navigation system detects the position of the vehicle, reads out map data pertaining to an area at the vehicle current position from a data storage medium, for example, a CD-ROM (compact disk read-only memory) or a DVD (digital videodisc), and displays a map image on a monitor (display) screen while superposing a mark representing the current location of the vehicle on a predetermined portion of the map image.

The vehicle position is determined by a self-contained navigation sensors (e.g. a distance traveled sensor and a bearing sensor) mounted in the vehicle or by a global positioning system (GPS) including a satellite (satellite navigation). The satellite navigation enables absolute position detection and higher position accuracy than the self-contained navigation sensors. However, the satellite navigation involves problem of position detection failure in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark stays at a predetermined position, for example, at the center of the image. In either methods, the navigation system enables the driver to recognize the map information of the area at the vehicle position at a glance.

When a destination is not set, such a navigation system functions as a locator map which indicates the current location of the vehicle on the map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a starting point and a destination are input, a CPU in the navigation system automatically determines a most suitable guided route and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

FIG. 1A shows an example of locator map display containing a vehicle current position mark VCP on a map image 21. Typically, a navigation system highlights the street on which the vehicle is running in the map image 21 and shows a name of the street such as "W 190TH ST" in an information box 23 on the display screen. Other information such as a north pointer NP, a map scale and a current time may also be illustrated on the display screen. In this manner, the locator map screen shows the current position of the vehicle on the map image, however, it does not perform the route guidance function because the destination is not set in the navigation system.

FIG. 1B shows an example of route guidance display which performs the route guidance function. The route guidance display is activated after specifying the destination of travel. In addition to the map image 21 similar to the locator map of FIG. 1A, this example further shows an arrow indicating the direction (left) in which the vehicle is to turn at the intersection in a guidance information box 22 at the top of the screen. The guidance information box 22 also shows a name of the street "PRAIRIE AVE" which intersects with the current street "W 190TH ST" and a distance to the intersection. Thus, the navigation system indicates that the vehicle should make a left turn at the intersection with "PRAIRIE AVE". Typically, the current street "W 190TH ST" and the left side of the street "PRAIRIE AVE" will be highlighted in the map image 21.

Further, such route guidance is accompanied by spoken instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. FIGS. 2A–2F show examples of display shown on the screen during the operation of inputting the destination.

By operating a menu key, a main menu 25 such as shown in FIG. 2A is displayed on the navigation system and a menu item "Destination" is selected from the main menu. This allows the navigation system to display a "Enter Destination by" menu 27 as shown in FIG. 2B for specifying an input method for selecting the destination. The "Enter Destination by" menu 27 lists various methods for selecting the destination including "Address" for specifying the city and address of the destination, "Intersection" for specifying the names of two streets which intersect with one another, and "Point of Interest" for selecting the programmed destination based on the category or telephone number. Other methods in the "Enter Destination by" menu 27 include "Recent Route" for specifying the destination based on the recent destinations (history) saved in the navigation system, "Address Book" for selecting the address of the destination out of the list of addresses stored in the system, and "Map Cursor" for specifying the destination by pointing a cursor to the destination on the map.

When selecting the "Point of Interest" in FIG. 2B, the navigation system displays a "Category List" menu 28 such as shown in FIG. 2C. The "Category List" menu 28 contains various different categories of destination such as "Bank", "Restaurant", "Hotel", "Shopping" and others. Supposing the category "Shopping" is selected, the navigation system displays a "Name List" such as shown in FIGS. 2D and 2E. The "Name List" shows names of shops and shopping malls sorted by, for example, distance from the vehicle. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of shops in the name list 36 such as shown in FIG. 2E.

When the desired destination is not prestored in the navigation system, a user can input the destination by selecting, for example, the "Address" method or "Intersection" method in the "Enter Destination by" menu 27 of FIG. 2B. Then, the navigation system displays an "Enter Street Name" shown in FIG. 2F for inputting the city and address in an address input box 37 by means of a key board 38 displayed on the display screen.

After inputting the destination, the navigation system determines a route to the destination based on, for example, by finding the shortest way to reach the destination. In the navigation system, the foregoing process of specifying the destination can be done either when the vehicle is running or stationary. While driving, a driver may want to change the destination or to set a new destination after reaching the original destination.

The operation of the navigation system, such as inputting the destination, requires the driver to press several keys of the navigation system. The driver has to look at the information on the display screen such as shown in FIGS. 2A–2C, or scroll the display such as shown in FIGS. 2D and 2E, or even input the destination through the key board such as shown in FIG. 2F. Thus, the navigation system may distract the driver's attention from safe driving. Therefore, for maintaining safe driving, it is necessary to simplify the operation of the navigation system by simplifying the key arrangement in the navigation system such as reducing the number and kind of keys.

SUMMARY OF THE INVENTION

It is, therefore, an object of the present invention to provide a display method and apparatus for vehicle navigation system which enables a driver to operate the vehicle navigation system with use of a limited number of keys without inversely affecting the functions of the navigation system.

It is another object of the present invention to provide a display method and apparatus for vehicle navigation system which enables a driver to easily and efficiently control the operation of navigation system.

It is a further object of the present invention to provide a display method and apparatus for vehicle navigation system which is capable of changing between a map screen and a zoom screen and adjusting a map scale or a zoom scale of a map image without using dedicated control keys.

In the present invention, the navigation system is designed to achieve an easy and efficient operation by a driver for displaying information or changing displayed images with use of a substantially simplified set of control keys. In the navigation system, an enter key functions not only to set and select a menu but also to switch between a map screen and a map zoom screen. Cursor keys function not only to scroll a map image in the map screen but also to adjust a zoom scale of the map image in the map zoom screen.

One aspect of the present invention is a display method of a navigation system such as a vehicle navigation system. The display method is comprised of the steps of displaying a map screen in which a map image is scrolled by operation of cursor keys, changing the map screen to a map zoom screen by operating an enter key in which a zoom scale of the map image is changed by operation of the cursor keys and a cursor marker is displayed at a predetermined position on the screen, and returning to the map screen from the map zoom screen by pressing the enter key. A zoom scale bar is displayed on the map zoom screen t show a degree of zoom scale and the zoom scale bar is dismissed in the map screen.

The map screen includes a locator map screen in which a vehicle current position is shown on the map image and a map scroll screen in which the cursor marker stays on a predetermined position on the screen and the map image is scrolled in up, down, right and left directions by the operation of the cursor keys. A map scale of the map screen is determined by the zoom scale in the map zoom screen. For example, the map scale in the map screen is increased from the zoom scale in the map zoom screen when the zoom scale is smaller than a predetermined level and when the enter key is pressed in the zoom screen before operating the cursor key.

The zoom screen includes a balloon image which shows a message associated with an area specified by the cursor marker when the zoom scale of the map image is smaller than a predetermined scale. Further, the map screen and the map zoom screen include POI (point of interest) icons each indicating POI locations by a predetermined icon. The POI icons are displayed when a map scale in the map screen or the zoom scale in the map zoom screen is larger than a predetermined scale.

The zoom scale bar in the map zoom screen includes a zoom slider which moves in a right or left direction on the zoom scale bar in response to the operation of the cursor key and changes an icon thereon depending on the position on the zoom scale bar wherein the icon on the zoom slider indicates a type of next screen that will be displayed when pressing the enter key.

The message accompanied by the balloon image indicates availability of a name list corresponding to POI (point of interest) icons in the area specified by cursor marker in a name list screen that will be displayed when pressing the enter key. The name list screen displays a list of names and addresses of the POI and a position of the cursor marker, and wherein a destination is selected through the name list screen and a route to the selected destination is determined by the navigation system.

Preferably, a map scale of the map screen is determined by the zoom scale in the map zoom screen when the enter key is pressed in the zoom screen before operating the cursor key. For example, the map scale in the map screen is increased to a high range map scale from the zoom scale in the map zoom screen when the zoom scale is smaller than a predetermined high threshold level but is larger than a predetermined middle threshold level, and the map scale in the map screen is increased to a middle range map scale from the zoom scale in the map zoom screen when the zoom scale is smaller than the predetermined middle threshold level.

In another aspect of the present invention, a display method of a vehicle navigation system is comprised of the steps of displaying a locator map screen in which a vehicle current position is shown on a map image, changing the locator map screen to a map scroll screen by operating cursor keys in which a map image is scrolled in up, down, right and left directions in response to the operation of the cursor keys while a cursor marker is displayed at a predetermined position on the map scroll screen, changing either from the locator map screen or the map scroll screen to a map zoom screen by pressing an enter key in which a zoom scale of the map image is changed by operation of the cursor keys and the cursor marker is displayed at a predetermined position on the map zoom screen, and selecting the zoom scale by pressing the enter key after adjusting the zoom scale by operating the cursor keys in the map zoom screen, thereby returning to the locator map screen with the selected zoom scale or moving to a name list screen in which a list of names of POI (point of interest) specified by the cursor marker or an address of a location specified by the cursor marker is displayed. A zoom scale bar is displayed on the map zoom screen to show a degree of zoom scale, and the zoom scale bar is dismissed in the map screen.

A further aspect of the present invention is a display apparatus of a vehicle navigation system. The display apparatus includes means for displaying a locator map screen in which a vehicle current position is shown on a map image, means for changing the locator map screen to a map scroll screen by operating cursor keys in which a map image is scrolled in response to the operation of the cursor keys while a cursor marker is displayed at a predetermined position on the map scroll screen, means for displaying a map zoom screen by pressing an enter key in which a zoom scale of the map image is changed by operation of the cursor keys and the cursor marker is displayed at a predetermined position on the map zoom screen, and means for returning to the map screen from the map zoom screen by pressing the enter key, wherein a zoom scale bar is displayed on the map zoom screen to show a degree of zoom scale and the zoom scale bar is dismissed in the locator map screen or map scroll screen.

According to the present invention, the display method and apparatus for vehicle navigation system enables the driver to operate the navigation system with use of a reduced number of control keys without adversely affecting the safe driving of the vehicle. Since the number and type of control keys are reduced, the driver is able to operate the navigation system easily and quickly. Further, since the arrangement of control keys is simplified, the driver can driver the car safely without being distracted by operating the navigation system. Since the control key arrangement in the navigation system is simplified, the space required for the panel of the navigation system can be reduced.

BRIEF DESCRIPTION OF THE DRAWINGS

FIGS. 2A–2F are schematic diagrams showing display examples of a vehicle navigation system. FIG. 2A is a main menu, FIG. 2B is a destination set menu, FIG. 2C shows a list of category when setting a point of interest in FIG. 2B, FIGS. 2D and 2E show name lists in the category specified in FIG. 2C, and FIG. 2F shows a key board display for entering addresses or intersections.

FIG. 11 is a schematic diagram showing another example of display images in the navigation system of the present invention in which the operation is controlled by the key arrangement shown in FIG. 4.

FIGS. 12A and 12B are schematic diagrams showing a further example of display images in the navigation system of the present invention in which the operation is controlled by the key arrangement shown in FIG. 4.

FIGS. 15A and 15B are schematic diagrams showing a further example of displayed images in the navigation system of the present invention in which the operation is controlled by the key arrangement shown in FIG. 4.

FIG. 17 is a schematic diagram showing a further example of displayed images in the navigation system of the present invention where the initial setting of zoom scale is classified into three different levels depending on the map scale in the map screen.

DETAILED DESCRIPTION OF THE PREFERRED EMBODIMENTS

The navigation system of the present invention is designed to achieve an easy and efficient operation by a user for displaying information or changing displayed images with use of a substantially simplified set of control keys. Since the navigation system is used while the user is driving a vehicle, it is preferable to reduce the number of keys to simplify the operation of the navigation system. Further, there is a limit in the space of the front panel of the vehicle, it is preferable to reduce a space for control keys of the navigation system. Therefore, the present invention is directed to the navigation system which has a simplified and reduced number of control keys for enabling the user to easily and efficiently operate the navigation system.

Figure 3:
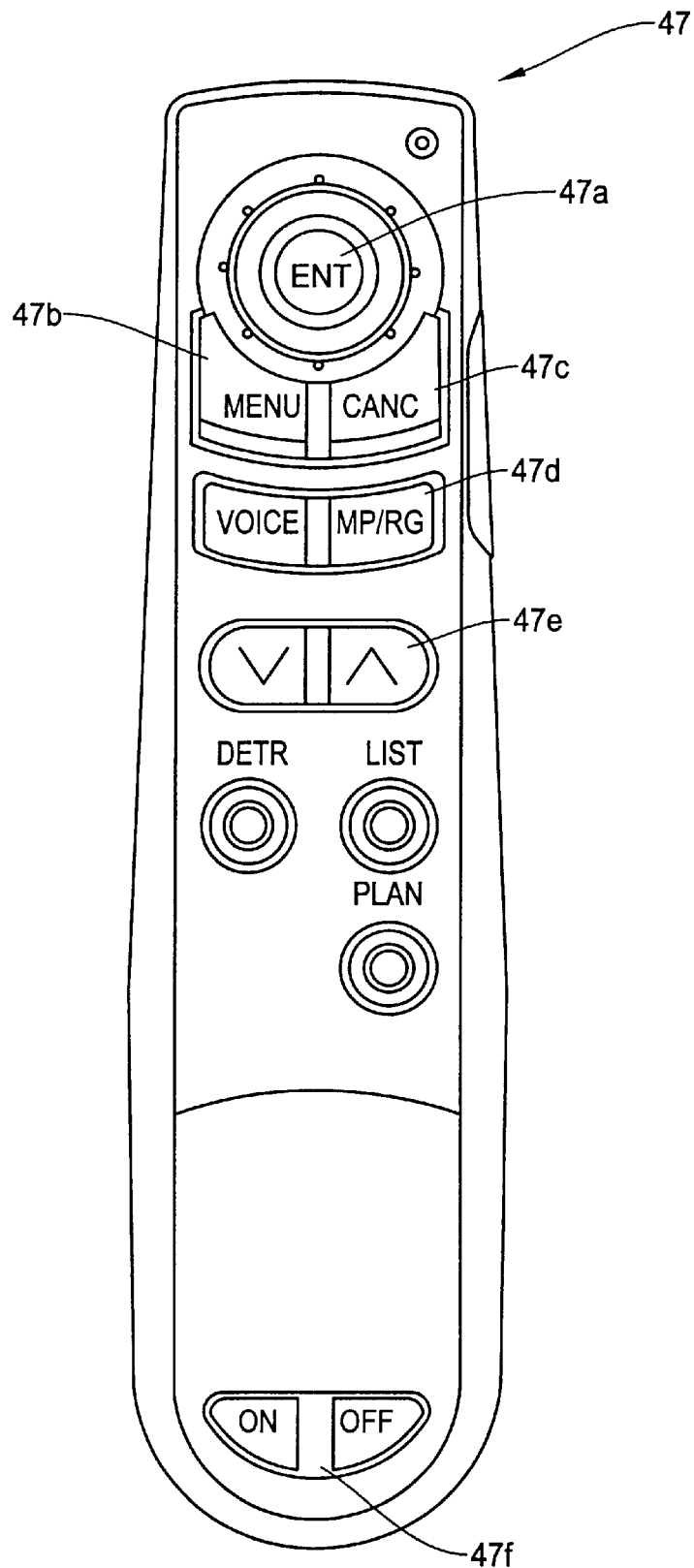
FIG. 3 is a diagram showing an example of remote controller accompanied by a vehicle navigation system of conventional technology.

To facilitate better understanding of the present invention, FIG. 3 shows an example of key arrangement in the conventional navigation system. Although the example of FIG. 3 is a remote controller, the same key arrangement may be made on the front panel of the navigation system. Through a remote controller 47 of FIG. 3, the user controls a menu selection operation, an enlarge/reduce operation, a destination input operation, etc.

As shown in FIG. 3, the remote controller 47 includes a joystick/enter key 47a, a menu key 47b, a cancel key 47c, an MP/RG key 47d, a zoom/scroll key 47e, a monitor ON/OFF key 47f, and so on. The joystick/enter key 47a has a function as a joystick key for moving the cursor or vehicle current position mark, etc., relatively in one of, for example, eight directions in the map or moving (highlighting) a menu bar when selecting a desired menu item. The joystick/enter key 47a also acts as an enter key for setting and inputting the cursor point and selecting and inputting the menu.

The menu key 47b displays menu screen such as a main menu or associated pull down menu, and the cancel key 47c cancels the present displayed screen or returns the screen to an initial screen of the menu. The MP/RG key 47d is operated when switching guiding modes (map guide mode and arrow mode), and when enlarging/reducing the map and vertically shifting the highlight point in various lists. The zoom/scroll key 47e is operated when changing a map magnification ratio (zoom scale) upward or downward or scrolling listings on the display screen.

Figure 4:
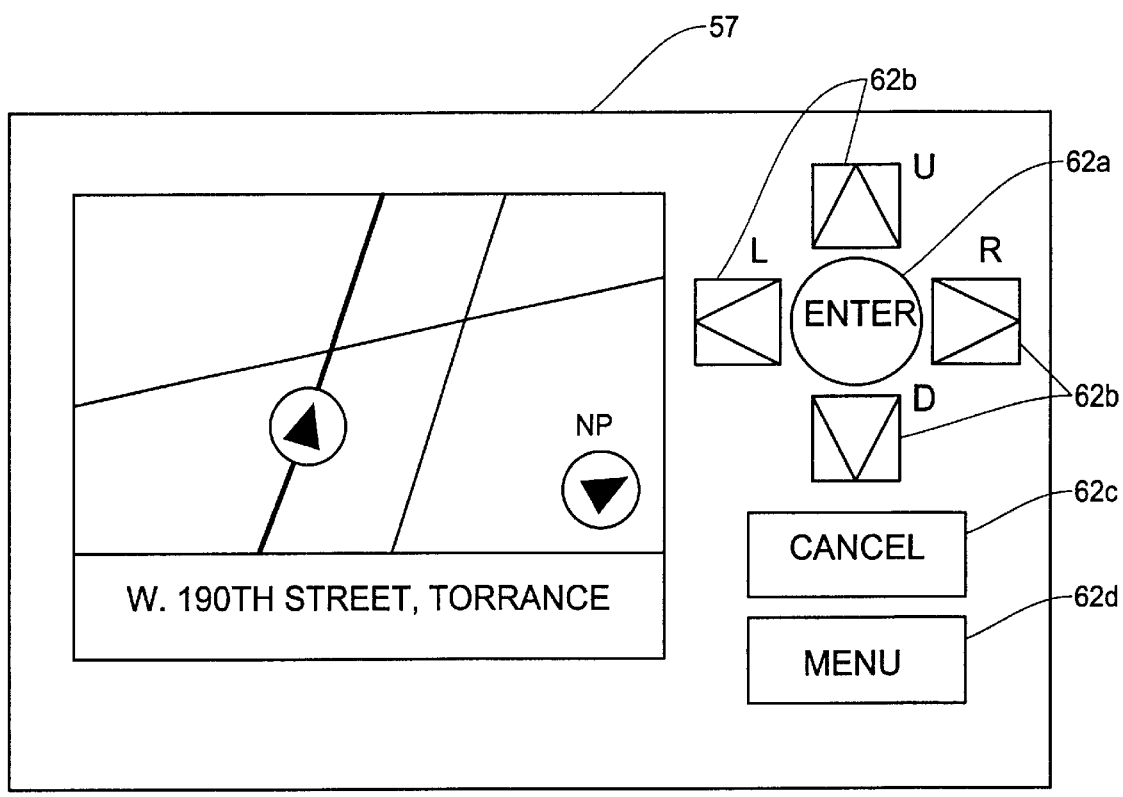
FIG. 4 is a schematic diagram showing an example of controller having a limited number and kind of control keys in the navigation system of the present invention.

In contrast to the key arrangement of FIG. 3, the present invention is based on the simplified key arrangement such as shown in FIG. 4. In this example, although the control keys are provided on the front panel of the navigation system, it is also possible to incorporate such key arrangement on a remote controller in a manner as shown in FIG. 3. On the front panel of a monitor 57 of the navigation system, only four types of control keys are provided, i.e., an enter key 62a, cursor keys 62b a cancel key 62c and a menu key 62d.

The enter key (selection key) 62 is to set and select a menu as well as to select either a map mode (locator map screen or map scroll screen) or a zoom mode (map zoom screen). The cursor keys (scroll means) 62b are provided to move the cursor on the display screen in up, down, right and left directions to scroll the map image as well as to increase and decrease (zoom-up and zoom-down) the scale of the map image. The cancel key 62c is to cancel the current screen or return to the previous screen and the menu key 62d is to display a menu screen.

Figure 5:
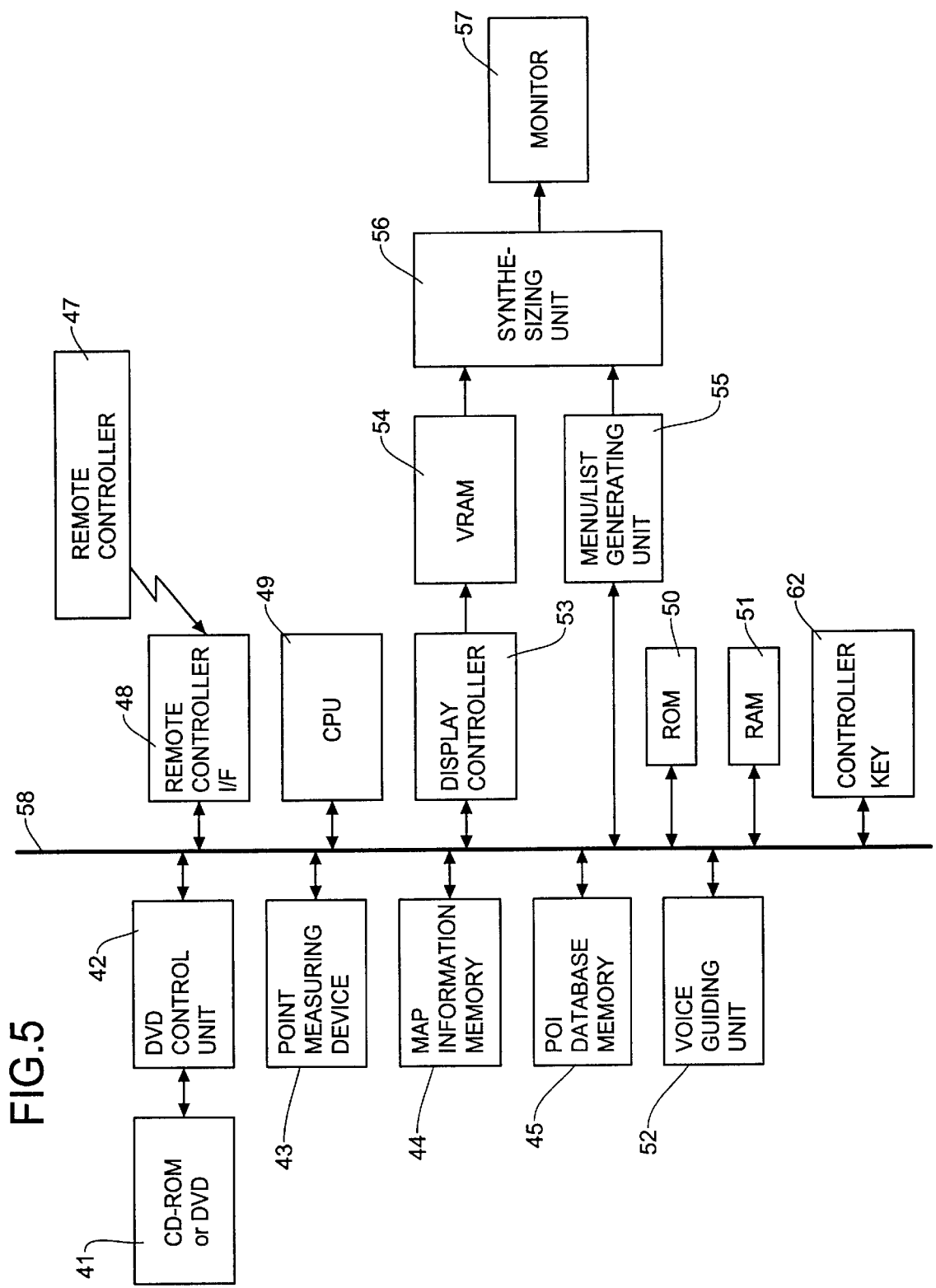
FIG. 5 is a block diagram showing an example of structure in the vehicle navigation system according to the present invention.

FIG. 5 shows a basic structure of the navigation system of the present invention. In the block diagram of FIG. 5, the navigation system includes a map storage medium 41 such as a CD-ROM or DVD (hereafter "DVD") for storing map information, a DVD control unit 42 for controlling an operation for reading the map information from the DVD, a point measuring device 43 for measuring the present vehicle position which has a vehicle speed sensor for detecting a moving distance, a gyro for detecting a moving direction, a microprocessor for calculating a position, a GPS receiver, and etc., a map information memory 44 for storing the map information which is read out from the DVD 41, a database memory 45 for storing database information such as point of interest (POI) information read out from the DVD 41.

The navigation system further includes a processor (CPU) 49 for controlling an overall operation of the navigation system, a ROM 50 for storing various control programs such as a route search program and a map matching program necessary for navigation control, a RAM 51 for storing a processing result such as a guide route, a voice guiding unit 52 for guiding a traveling direction at an intersection with spoken instructions, a control key 62 which is configured with the enter key 62a, cursor keys 62b, cancel key 62c and menu key 62d as noted above with reference to FIG. 4.

The block diagram of FIG. 5 further includes a display controller 53 for generating map images (such as a map guide image and an arrow guide image) on the basis of the map information, a VRAM 54 for storing the images generated by the display controller 53, a menu/list generating unit 55 for generating various menu and list images, a synthesizing unit 56 for synthesizing images from the VRAM 54 and the menu/list generating unit 55, a display 57 formed by, for example, an LCD panel, and a bus 58 for interfacing the above listed units in the navigation system.

Figure 6:
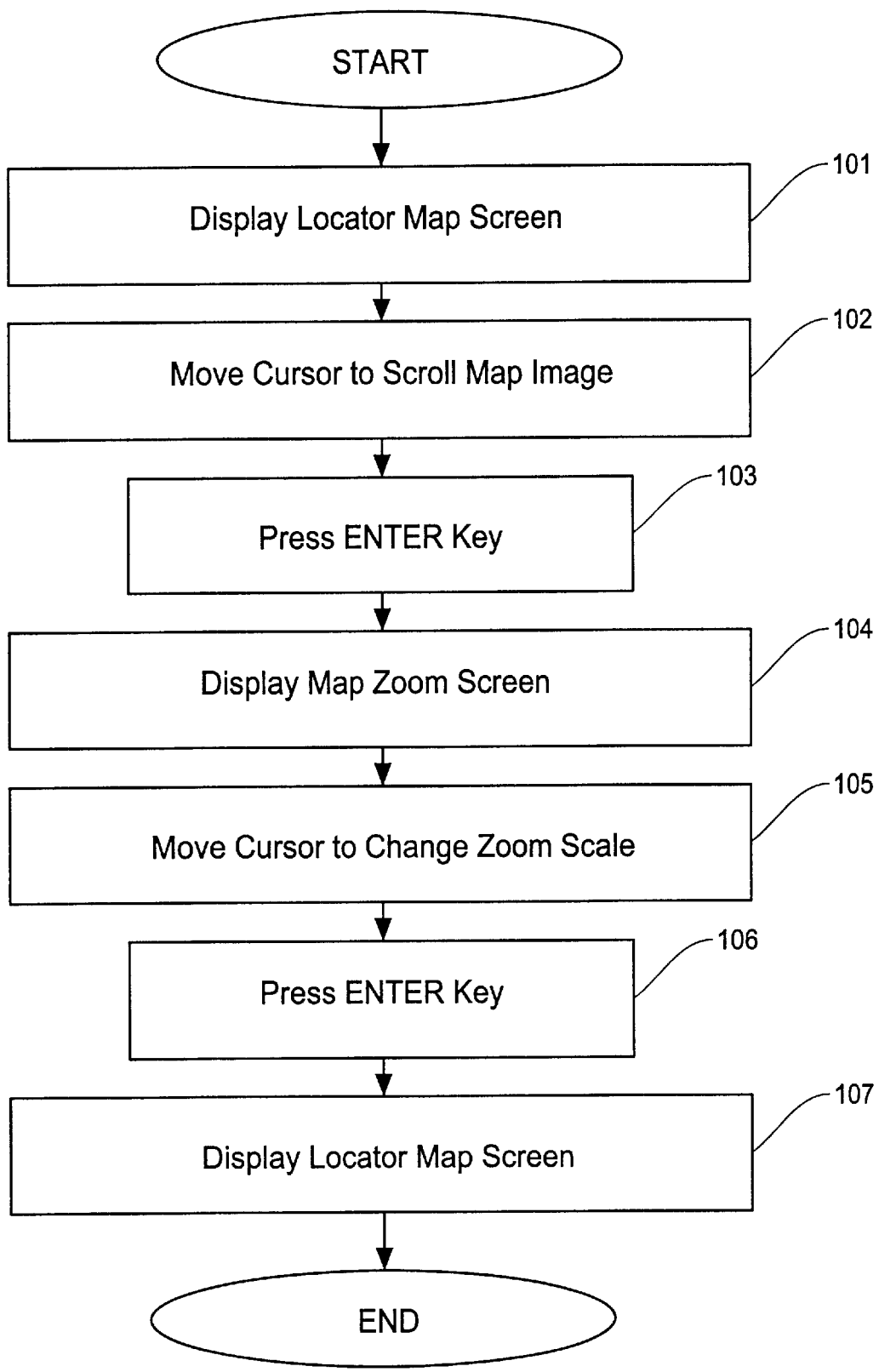
FIG. 6 is a flow chart showing a basic operational flow in the navigation system of the present invention using the reduced number of control keys in the controller such as shown in FIG. 4.

The basic operational flow in the navigation system of the present invention is shown in FIG. 6. In the present invention, the enter key (selection key) 62a of FIG. 4 functions not only to set and select a menu but also to switch between the map mode and the zoom mode. Further, the cursor keys (scroll means) 62 function not only to scroll the map image in the up, down, right and left directions but also to increase (zoom in) and decrease (zoom out) the scale of the map image.

It should be noted that, within the context of this invention, it is defined that a "map scale" or a "zoom scale" is increased when the monitor screen shows an enlarged view of a small area and it is decreased when the monitor screen shows a larger area. In other words, the "map scale" or "zoom scale" is indicated in terms of fractions such as $\frac{1}{5,000}$ wherein the largest scale is "$\frac{1}{1}$", although such specific numbers are not used in this invention.

In the flow diagram of FIG. 6, when the navigation system is in a map mode (locator map screen or map scroll screen) at step 101, the cursor keys (scroll means) 62b work as map scroll keys. Thus, at step 102, by pressing the cursor keys 62b, the displayed map image can be scrolled in, for example, up, down, right and left directions. If the user presses the enter key (selection key) 62a in step 103, the navigation system is switched to a zoom mode (map zoom screen) at step 104 wherein the display screen may include, for example, a zoom scale indicator such as a scale bar. In the zoom mode, the cursor keys 62b, such as right and left cursor keys work as zoom keys to increase or decrease the zoom scale of the map image. Thus, at step 105, by pressing the right or left key cursor key, the user can increase or decrease the size of the map image. After changing the size of the image, by pressing, for example, the enter key 62a again, the new zoom scale is set in the navigation system.

When the map image is sufficiently enlarged, the navigation system is able to identify each of POI (point of interest) icons and/or streets on the display. Thus, in a predetermined zoom scale, the user can select a destination through the brake down menu on the display screen. Such a process will be described later. By pressing the enter key 62a, the navigation system goes back to the map mode (locator map screen) at step 107. Depending on the zoom scale immediately before operating the enter key 62a, the display size of the map mode may be changed to the predetermined size or unchanged, which will also be described later.

Figure 7:
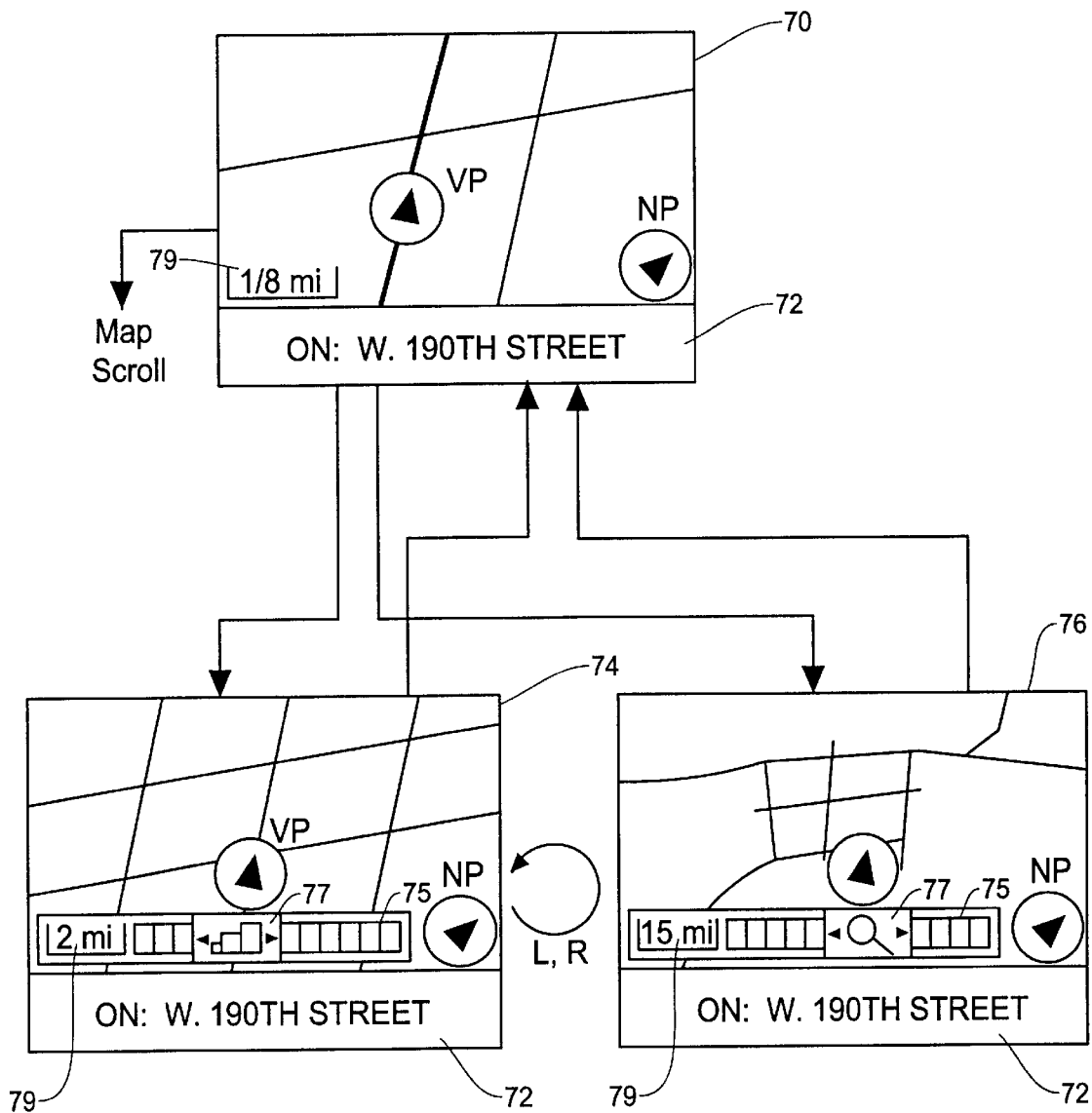
FIG. 7 is a schematic diagram showing an example of displayed images in the navigation system of the present invention in which the operation is controlled by the key arrangement shown in FIG. 4.

FIG. 7 shows an example of display images in the navigation system of the present invention which is operated by the simplified set of control keys of FIG. 4. In this example, the navigation system displays a locator map screen 70 showing a vehicle current position mark VP (i.e., current user position) on he map image. The locator map screen 70 also shows an information box 72 indicating the name of the current street on high the vehicle is running. Typically, the current street is highlighted or enlarged in the map image. Other information such as a current time, a map scale and a north pointed NP may also be shown in the locator map screen 70.

By operating the cursor keys 62b (FIG. 4), the system scrolls the map image (screen 88 in FIG. 10) in predetermined directions such as up, down, right and left (map scroll mode or map scroll screen). By operating the enter key 62a, the system changes to the zoom mode such as map zoom screens 74 and 76. In this example, the zoom scale in the zoom screen is determined by the map scale immediately before the enter key 62a is pressed. For example, when the map scale in the locator map screen 70 is ⅛ miles per ruler or larger, by pressing the enter key 62a, the display changes to the map zoom screen 74 which has a relatively large zoom scale such as 2 miles per ruler. When the map scale in the locator map screen 70 is smaller than ⅛ miles, by pressing the enter key, the display changes to the map zoom screen 76 with a relatively small zoom scale such as 15 miles per ruler.

Each of the map zoom screens 74 and 76 includes a zoom scale bar (zoom scale indicator) 75, a slider 77 and a map scale reading 79. The zoom scale bar 75 indicates several different levels of map (zoom) scale, such as from 1/20 miles per ruler (largest) to 350 miles per ruler (smallest) in nine steps which will be described in more detail later. The zoom scale is selected by controlling the cursor keys (scroll means) 62b in right or left. In this example, the slider 77 moves along the zoom scale bar 75 in response to the control of the cursor keys 62b. Preferably, an icon on the slider changes depending on the position of the slider on the zoom scale bar 75, which will be described in more detail later.

In the map zoom screen 74, when pressing the enter key 62a before using any cursor keys 62b, i.e., without changing the zoom scale, the display screen goes back to the original locator map screen 70. However, after controlling the cursor keys 62b, and thus, changing the map (zoom) scale, the new map scale is set by pressing the enter key. At the same time, the system goes back to the locator map screen 70 with new map scale in which the zoom scale bar 75 disappears.

In the map zoom screen 76, when pressing the enter key 62a before using any cursor keys 62b, i.e., without changing the zoom scale, the display screen goes back to the locator map screen 70 with a predetermined map scale. As noted above, the map zoom screen 76 is displayed when the previous locator map screen has a map scale (for example, 5 miles per ruler) smaller than the predetermined scale such as ⅛ miles per ruler. In this situation, without changing the map (zoom) scale in the screen 76, by pressing the enter key 62a, the system goes back to the locator map screen with the predetermined (fixed) map scale such as ⅛ miles which is larger than the original map scale.

Figure 8:
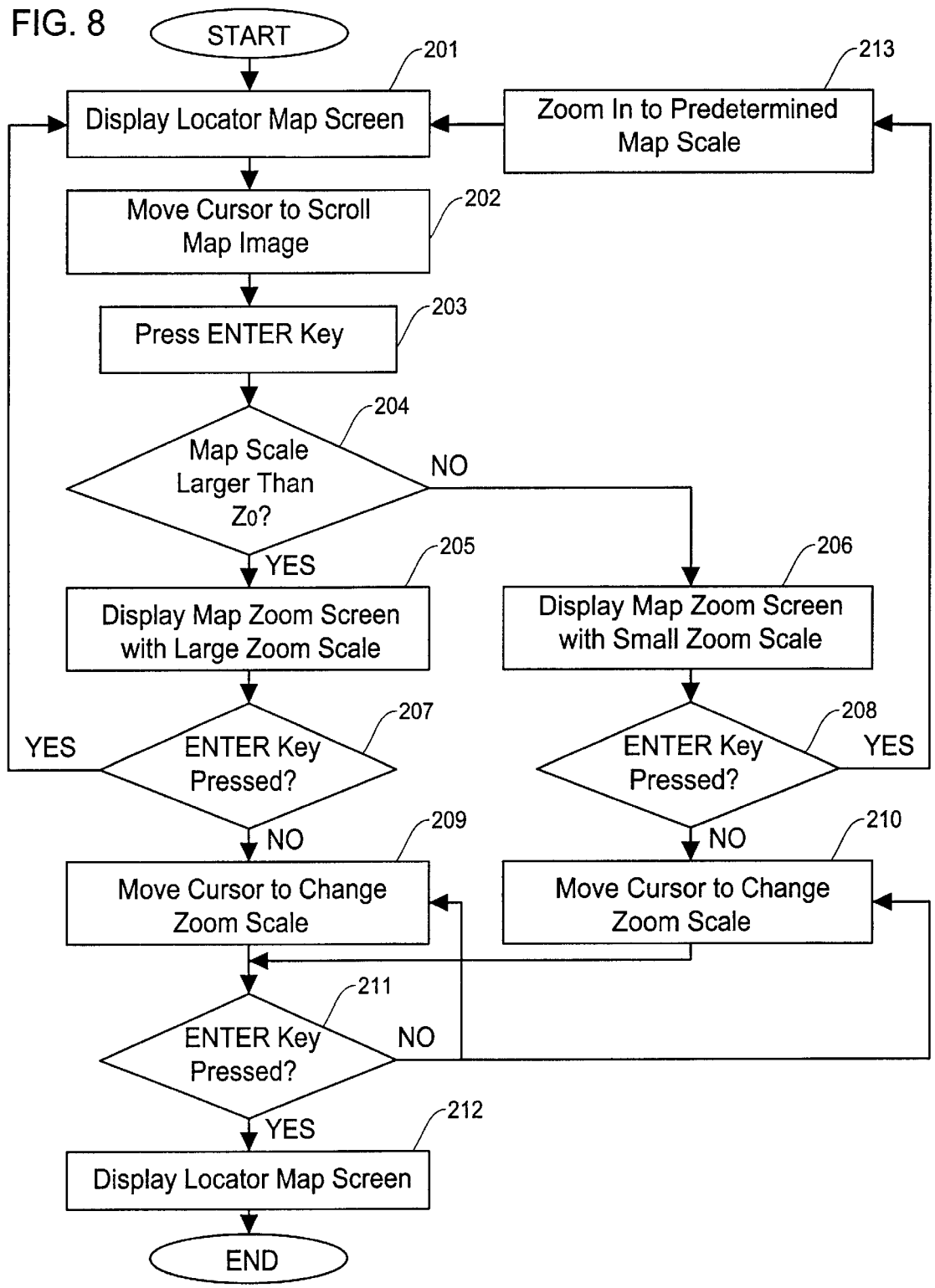
FIG. 8 is a flow chart showing a more detailed example of operational flow in the navigation system of the present invention using the limited number of control keys in the controller as shown in FIG. 4.

FIG. 8 is a flow chart showing the operation of the navigation system of the present invention. As noted above, the additional role of the enter key (selection key) 62a is to switch between the map mode (locator map screen or map scroll screen) and the zoom mode. Further, as noted above, the additional function of the cursor keys 62b is to increase or decrease the map (zoom) scale. In FIG. 8, when the navigation system is in the locator map mode at step 201, the cursor keys 62b (FIG. 4) work as map scroll keys. Thus, at step 202, by moving the cursor keys 62b, the displayed map image is scrolled in up, down, right and left directions (map scroll screen).

If the user presses the enter key 62a in step 203, the navigation system is switched to the zoom mode in which an initial zoom scale in the map zoom screen is determined by the map scale in the locator map screen in the step 201 or the map scroll screen in the step 202. Namely, at step 204, it is determined whether the map scale before pressing the enter key (step 203) is larger than a predetermined value $Z_o$. When it is smaller than the predetermined value $Z_o$, at step 205, the navigation system displays a map zoom screen of a large zoom scale. If the map scale is smaller than the predetermined value, at step 206, the navigation system displays a map zoom screen of a small zoom scale. Here, the larger zoom scale means that a map image is enlarged so that a small area is shown on the full screen. In contrast, the smaller zoom scale means that a wider are of the map is illustrated on the display.

In the zoom mode, at step 207 or 208, it is determined whether the enter key is pressed before changing the zoom scale, i.e., before operating the cursor keys 62b. If it is determined that the cursor keys 62b are not used, at step 207, the system goes back to the locator map screen 201 without any change in the map scale. If it is determined that the cursor keys 62b are not used, at step 208, the scale of the map zoom screen increases (zoom in) at step 213 and goes back to the locator map screen 201.

However, if the cursor keys 62b are used in either the step 207 or step 208 before pressing the enter key 62a, the zoom scale is changed at either step 209 or step 210 in response to the right or left operation of the cursor keys 62b. After that, if the enter key is pressed at step 211, the zoom (map) scale is set and the system moves to the locator map screen with the new map (zoom) scale at step 211. In contrast, unless the enter key is pressed, the zoom scale varies by the movement of the cursor keys 62b in the right and left at step 209 or 210.

Figure 9A:
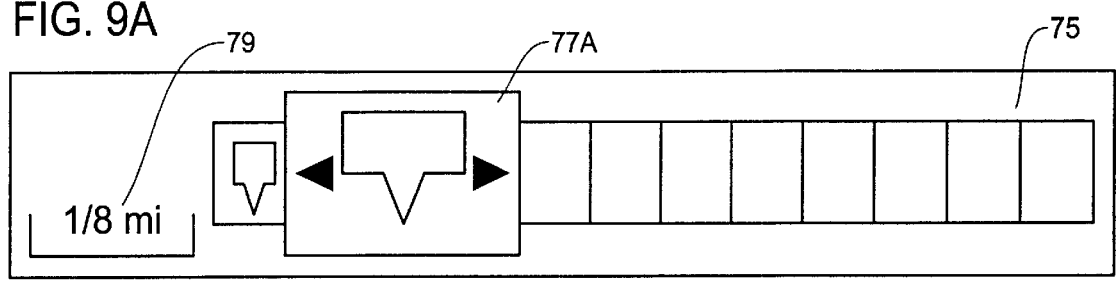
FIGS. 9A–9C are schematic diagrams showing examples of image of zoom scale bar displayed on the map zoom screen in the present invention.
Figure 9B:
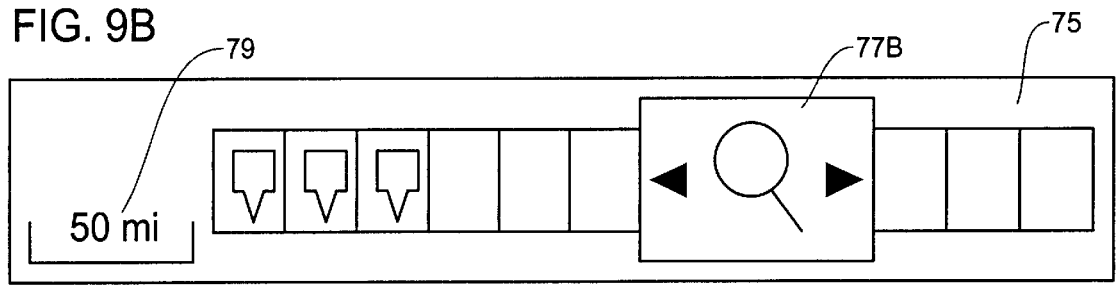
Figure 9C:
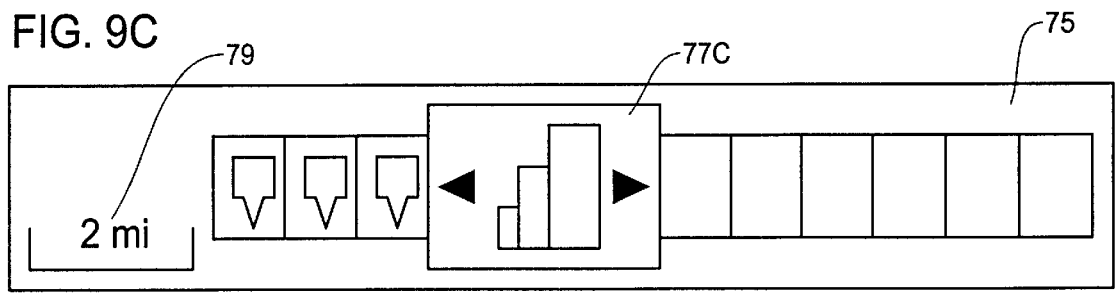

FIGS. 9A–9C show examples of zoom scale bar displayed on the map zoom screen in the navigation system of the present invention. In this example, the zoom scale bar 75 has about ten different zoom scales which are larger in the left and smaller in the right. When the cursor keys 62b are operated in right or left, the slider 77 moves accordingly, which changes the zoom scale. At the same time, the map scale reading 79 changes its value corresponding to the position of the slider on the zoom scale bar 75. In the example of FIGS. 9A–9C, the zoom scale bar 75 shows balloon icons in the left to show large zoom scales. These icons on the zoom scale bar 75 show that when operating the enter key 62a to go back to the map mode and again coming back to the zoom mode, the display will show a balloon with a message assisting the driver to know the location of the destination or to determine the destination.

In the example of FIG. 9A, the zoom scale in the current display is ⅛ miles per ruler. This zoom scale is set either by operating the cursor keys 62b or automatically (as an initial setting) when the map scroll screen immediately before pressing the enter key 62a has the map scale which is equal to or larger than the predetermined size such as ⅛ miles per ruler. In this zoom scale, the slider 77A displays a balloon icon which means that a balloon with a message will be displayed if the enter key 62a is pressed at this stage. As noted above, the zoom scale bar 75 in FIGS. 9A–9C also show the balloon icons on the larger zoom scales in the left.

In the example of FIG. 9B, the zoom scale in the current display is 50 miles per ruler. This zoom scale is set either by operating the cursor keys 62b or automatically when the map scroll screen immediately before pressing the enter key 62a has the map scale which was smaller than the predetermined size such as ⅛ miles per ruler. In this zoom scale, the slider 77B displays a magnifier icon which means that displayed image is zoom-out so that the map image shows a wider area surrounding the vehicle current position when returning to the map screen. If this situation (smaller map scale) is set automatically as noted above, then by pressing the enter key 62a before any operations of the cursor keys 62b, the display goes back to the map scroll screen while the map scale zooms-in to a predetermined size (relatively larger scale) such as ⅛ miles per ruler. This is because the relatively large map scale such as ⅛ miles per ruler is ordinarily convenient scale and most frequently used by many users.

In the example of FIG. 9C, the zoom scale is changed by the movements of the slider 77 in response to the operation of the cursor keys 62b. When the slider 77 moves in the right or left direction, the icon on the slider 77C changes from the icon of FIG. 9A or 9B to a zoom scale icon of FIG. 9C which means that a display for larger area (smaller zoom scale) is available in the right direction and an enlarged display for smaller area (larger zoom scale) is available in the left direction. After moving the zoom slider 77C, by pressing the enter key 62a, the navigation system sets the map scale selected by the operation of the cursor keys 62b and changes the display to the locator map screen, i.e., the zoom scale bars 75 disappears.

Figure 10A:
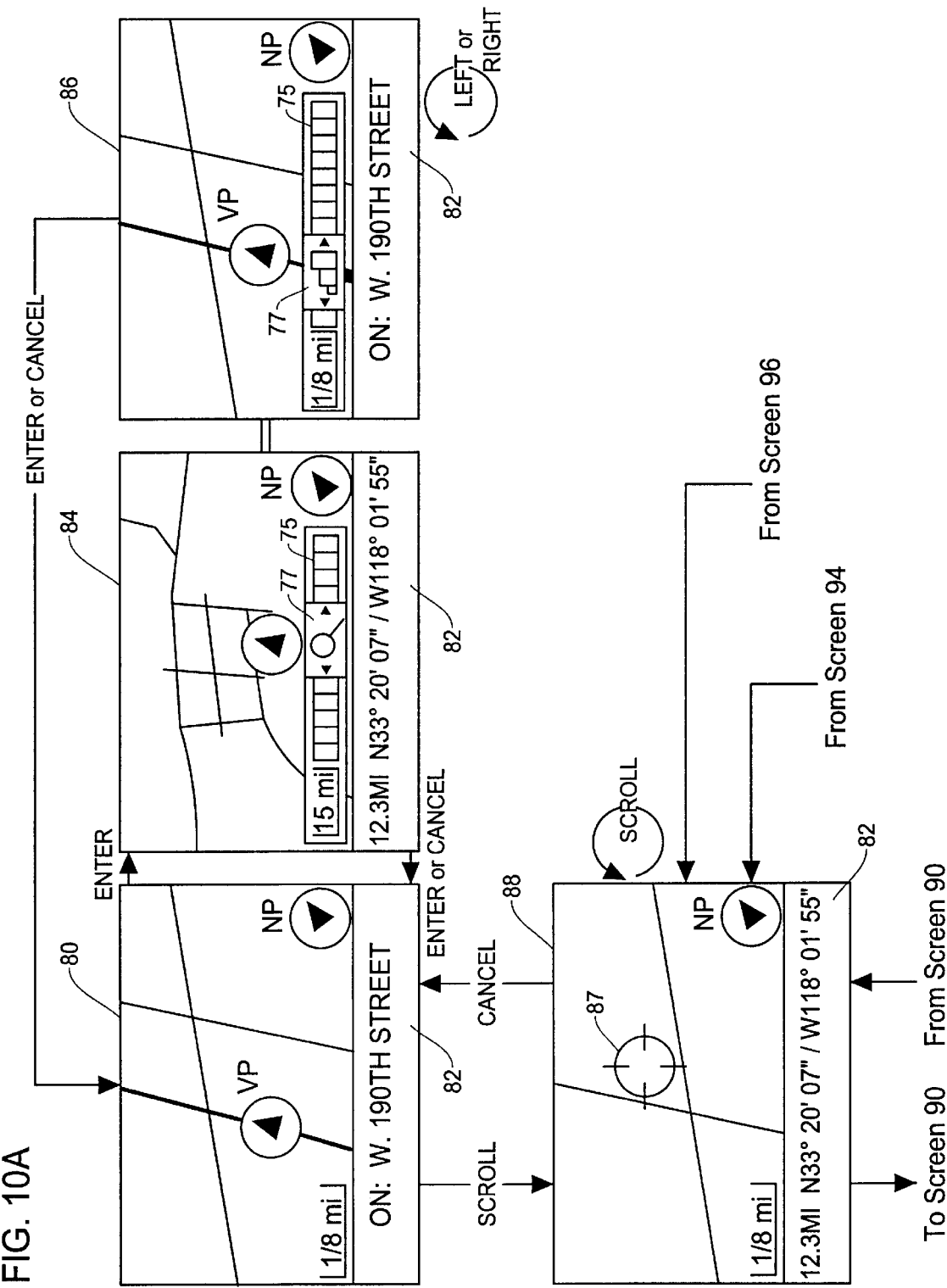
FIGS. 10A and 10B are schematic diagrams showing further examples of image of zoom scale bar displayed on the map zoom screen in the present invention.
Figure 10B:
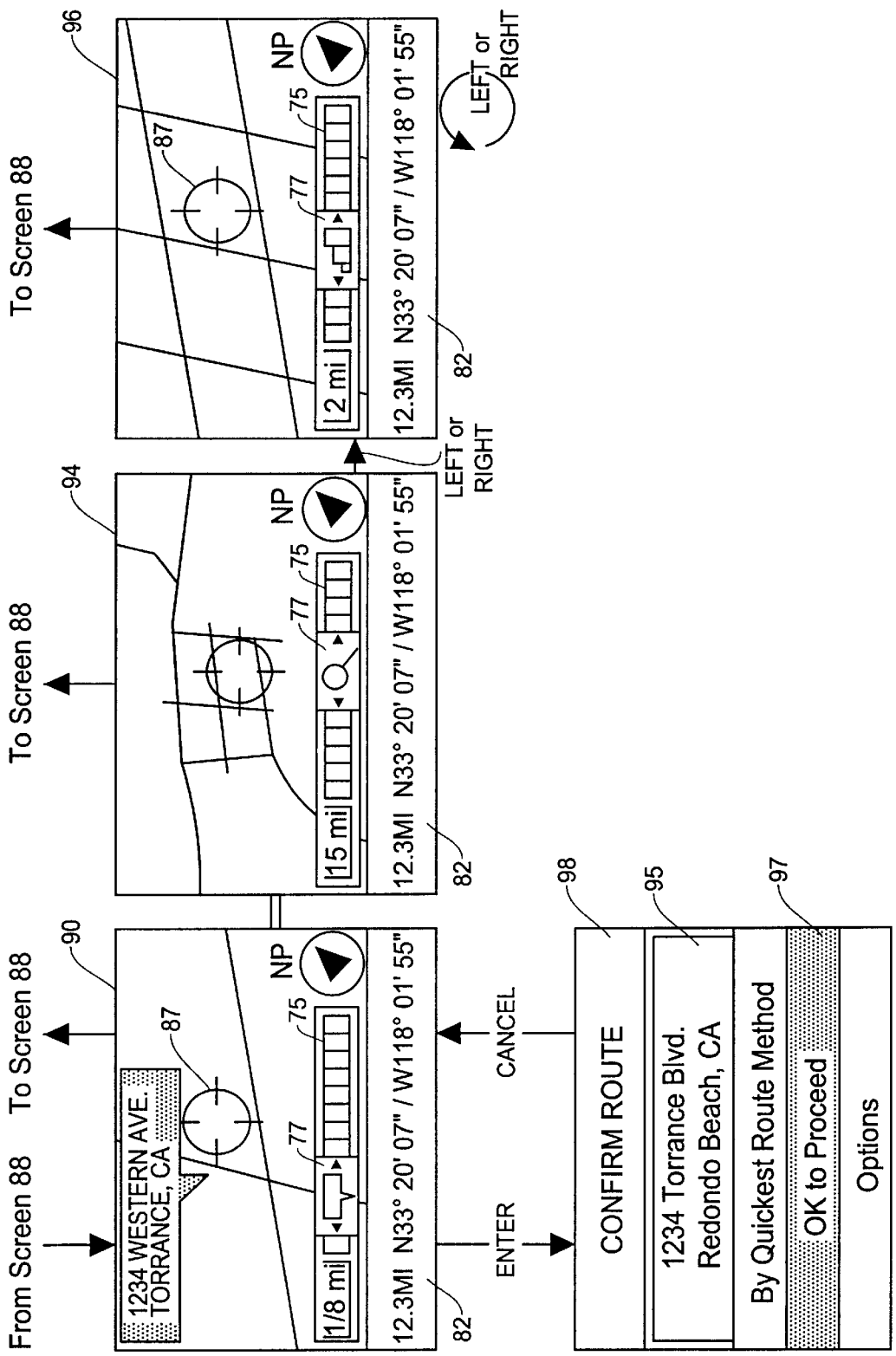

FIGS. 10A and 10B show another example of display images in the navigation system of the present invention which is operated by the simplified set of control keys such as shown in FIG. 4. In this example, the navigation system displays a locator map screen 80 showing a vehicle current position mark VP on the map image. The locator map screen 80 also shows an information box 82 indicating the name of the current street on which the vehicle is running. Typically, the current street is highlighted or enlarged in the map image. Other information such as a current time, a map scale and a north pointer NP will also be displayed in the locator map screen 80 as in FIG. 10A.

By operating (pressing) the enter key (selection key) 62a, the system moves to a map zoom screen 84 or 86 depending on the initial map scale in the locator map screen 80. However, if the cursor keys (scroll means) 62b is operated at the locator map screen 80, the system displays a cursor marker 87 at the center of a map scroll screen 88 and scrolls the map image in up, down, right and left directions. In the map scroll screen 88, by operating the enter key 62a again, the system changes to the map zoom mode such as a map zoom screen 90 or 94 depending on the last map scale in the screen 88. The zoom scale is selected in a map zoom screen 96 by operating the right and left cursor keys 62b. If a map scale is large enough to show a balloon 92 with a message in the zoom screen 90, the navigation system displays a brake down menu screen 98 for selecting a destination or other purposes such as confirming the information.

In the present invention, as noted above, the zoom scale in the map zoom screen is determined by the map scale when the enter key is pressed. For example, when the last map scale in the locator map screen 80 is ⅛ miles per ruler or larger, by pressing the enter key 62a, the display changes to the map zoom screen 86 which has a large zoom scale (view for smaller area) such as ⅛ miles per ruler. When the last map scale in the locator map screen 80 is smaller than ⅛ miles per ruler, by pressing the enter key, the display changes to the map zoom screen 84 with a small zoom scale (view for larger area) such as 15 miles per ruler.

In the map zoom screen 84, when pressing the enter key 62a or cancel key 62c before using any cursor keys 62b, i.e., without changing the zoom scale, the display screen goes back to the locator map screen 80 of a predetermined map scale such as ⅛ miles per ruler. In other words, the display zooms in from 15 miles per ruler to ⅛ miles per ruler. In the example of FIG. 10, the original locator map screen 80 was in the map scale of ⅛ miles per ruler, the system goes back to the same locator map screen. However, it is not necessary to return to the locator map screen of the same map scale. For example, when the original locator map screen 80 was in the map scale 2 miles per ruler, by pressing the enter key 62a, the map zoom screen 84 is displayed. By immediately pressing the enter key 62a again, the locator map screen with the map scale of ⅛ miles per ruler will be displayed. In other words, in this particular situation, the map scale in the locator map screen will be increased when continuously operating the enter key 62a by two times.

In the map zoom screen 86, when pressing the enter key 62a before using any cursor keys 62b, i.e., without changing the zoom scale, the display screen goes back to the original map scroll screen 80. Although not shown, after controlling the cursor keys 62b, and thus, changing the map (zoom) scale, the new map scale is set by pressing the enter key 62a. At the same time, the system goes back to the locator map screen with the newly selected map scale in which the zoom scale bar 75 disappears.

In the map scroll screen 88, the map image moves in up, down, right and left directions in response to the cursor keys 62b. The cursor marker 87 stays at the center of the screen 88 while the map image moves in the four directions. Alternatively, the cursor marker 87 moves in response to the cursor keys 62b while the map image stays on the display. Depending on the map scale and the scrolled map area, the vehicle current position may also be displayed. Preferably, the information box 82 shows the position of the cursor marker 87 by longitude and latitude.

In the map scroll screen 88, by pressing the enter key 62a, the system moves to the map zoom screen 90 or 94 as shown in FIG. 10B. As noted above, distinction between the map zoom screens 90 and 94 is made based on the map scale in the map scroll screen 88 when pressing the enter key 62a. For example, if the map scale in the map scroll screen 88 is ⅛ miles per ruler or larger, the system displays the map zoom screen 90 with a large zoom scale. In contrast, if the map scale in the map scroll screen 88 is smaller than ⅛ miles per ruler, the system displays the map zoom screen 94 with a small zoom scale.

In the map zoom screen 90, by pressing the cancel key 62c without operating the cursor keys 62b, the system goes back to the map scroll screen 88 (FIG. 10A). In the map zoom screen 94, by pressing the cancel key 62c without operating the cursor keys 62b, the system goes back to the map scroll screen 88 (FIG. 10A). However, by pressing the enter key 62a without operating the cursor key 62b, the system goes back to the locator map screen 80 with the predetermined map scale as described above. In operating the right or left cursor key 62b, the zoom scale is changed in the map zoom screen 96.

In the map zoom screen 90, the zoom (map) scale is large enough so that the cursor marker 87 is able to specify the street or POI (point of interest) icon. Thus, the balloon 92 appears which shows a message such as an address or a street name of the location specified by the cursor marker 87 or availability of POI icons in the area specified by the cursor marker 87. In the example of FIG. 10B, the balloon 92 shows the address of the location of the street specified by the cursor marker 87.

Figure 1A:
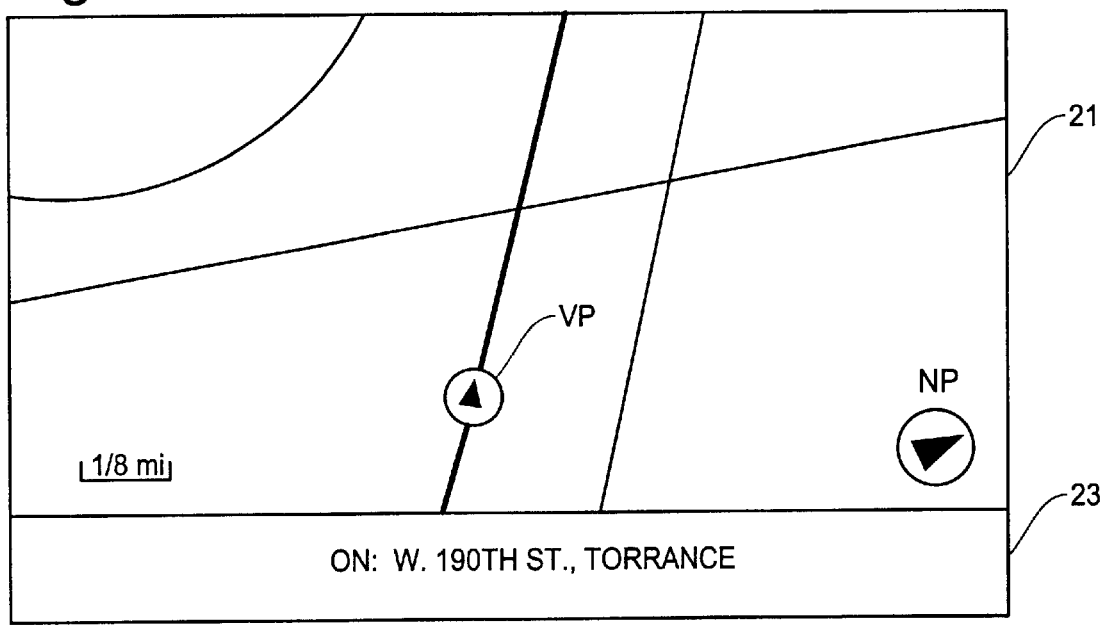
FIGS. 1A and 1B are schematic diagrams showing an example of locator map display and route guidance display, respectively, of a vehicle navigation system.
Figure 1B:
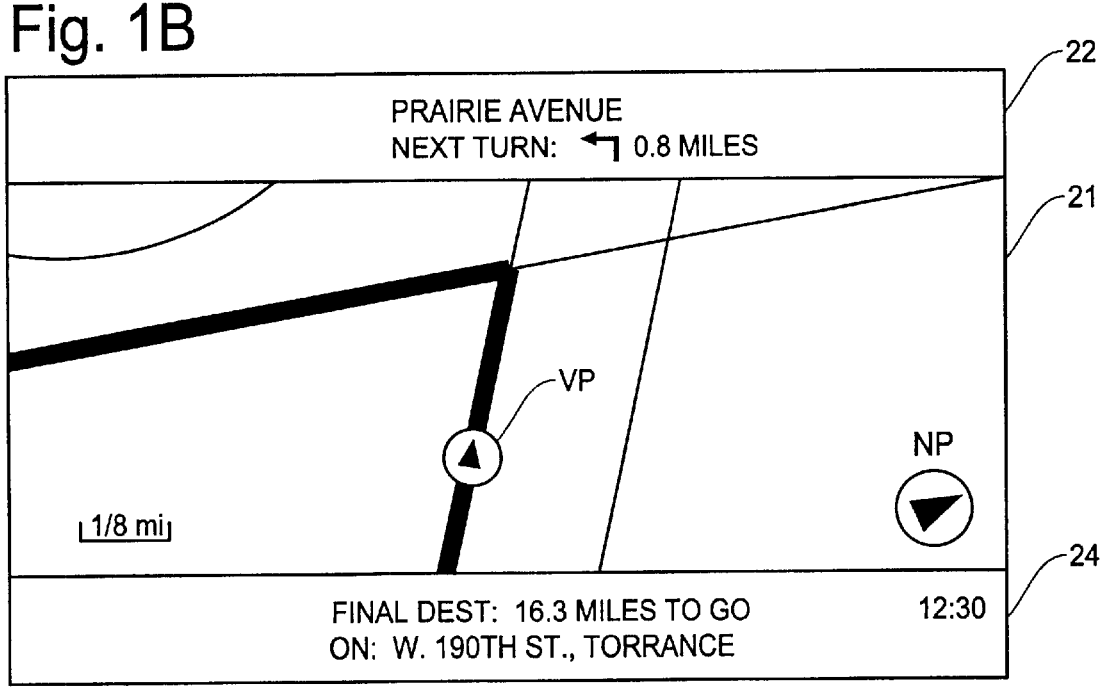
Figure 2D:
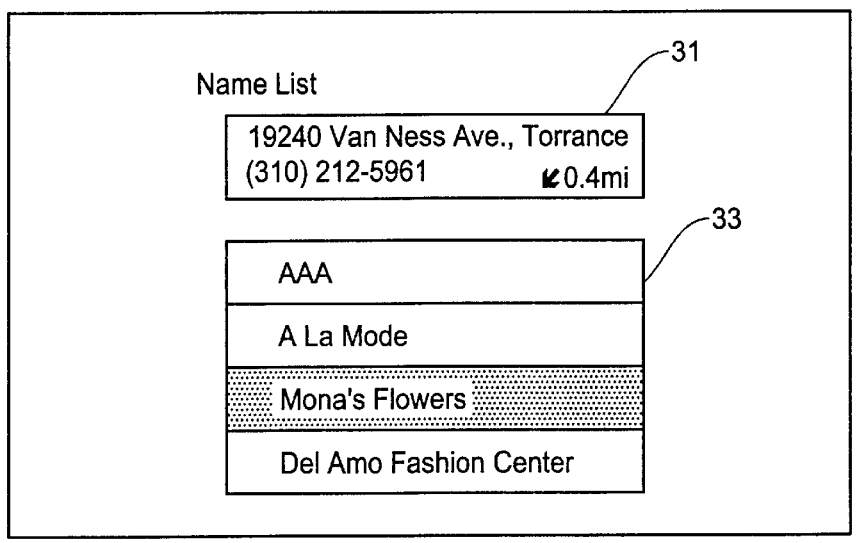
Figure 2E:
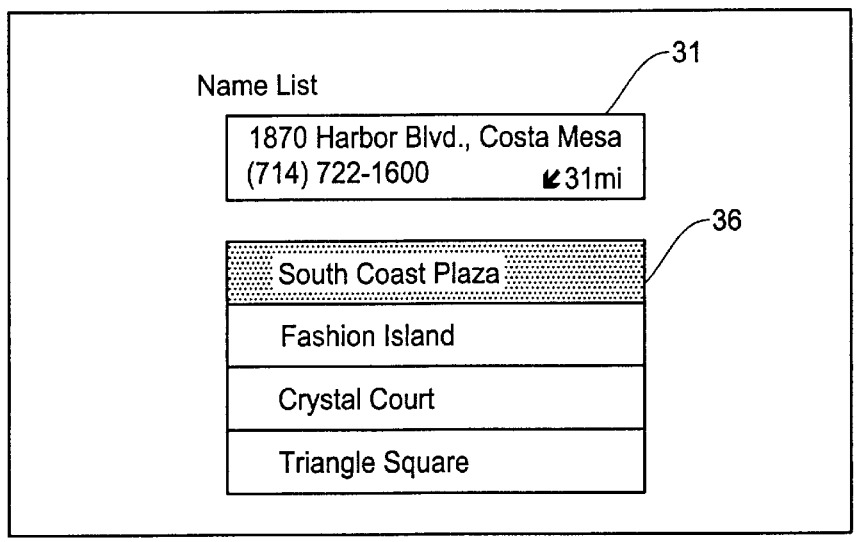
Figure 2F:
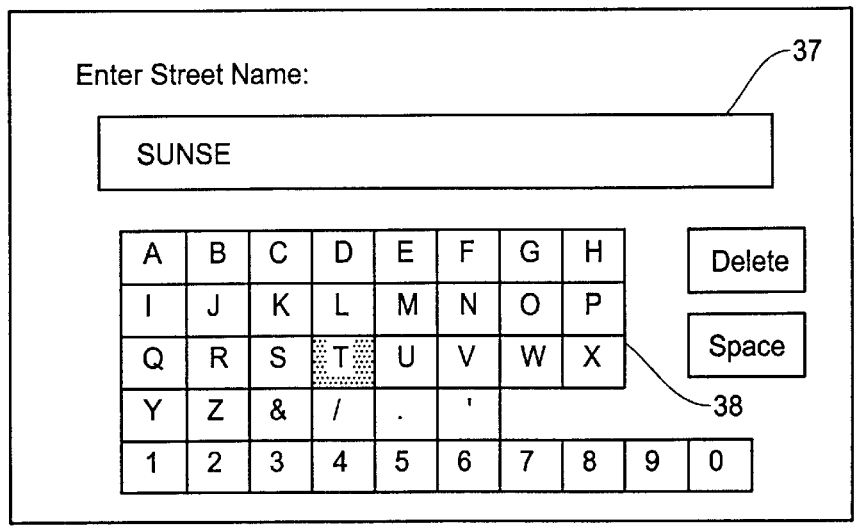

In the case where the specified address in the balloon is the location where the driver wants to go, by pressing the enter key 62a, the system displays the brake down menu screen 98 which includes an information box 95 and menu bars 97. In this example, the menu screen 98 is to confirm the destination indicated by the address in the information box 95. By selecting "OK TO PROCEED", the navigation system calculates the appropriate route to the destination, thereby moving to the route guidance screen such as shown in FIG. 1B for guiding the driver to the destination.

FIG. 11 shows a further example of display images in the navigation system of the present invention which is operated by the simplified control keys of FIG. 4. The locator map screen 80, map scroll screen 88, map zoom screens 94 and 96 are basically the same as those shown in FIGS. 10A and 10B. In this example, the navigation system displays a map zoom screen 102 which includes POI icons 103 within the cursor mark 87, a name list screen 104 listing the names of places indicated by the POI icons and an address of the specified POI icon, and a confirmation screen 108.

Similar to the example of FIGS. 10A and 10B, if the cursor keys 62b (FIG. 4) are pressed at the locator map screen 80, the system displays the cursor marker 87 at the center of the map scroll screen 88 and scrolls the map image in up, down, right and left directions. In the map scroll screen 88, by pressing the enter key 62a again, the system changes to the map zoom mode such as the map zoom screen 102 or 94 depending on the last map scale in the screen 88. The zoom scale is selected in a map zoom screen 96. If a map scale is large enough in the map zoom screen 102, a balloon 107 with a message will be displayed so that the navigation system moves to the name list screen (brake down menu) 104 for selecting a destination.

Switching between the map zoom screens 102 and 94 is made based on the map scale in the map scroll screen 88 when operating the enter key 62a. For example, if the map scale in the map scroll screen 88 is ⅛ miles per ruler or smaller, the system displays the map zoom screen 102 with a large zoom scale. In contrast, if the map scale in the map scroll screen 88 is smaller than ⅛ miles per ruler, the system displays the map zoom screen 94 with a small zoom scale.

In the map zoom screen 102, by pressing the cancel key 62c before operating the cursor keys 62b, the system goes back to the map scroll screen 88. In the map zoom screen 94, by pressing the cancel key 62c before operating the cursor keys 62b, the system goes back to the original map scroll screen 88. However, by pressing the enter key 62a before operating the cursor keys 62b, the system goes back to the map scroll screen with the predetermined map scale as described above. In operating the right or left cursor key 62b, the zoom scale is changed in the map zoom screen 96. Thus, by increasing the zoom scale in the map zoom screen 96, the same screen as the map zoom screen 102 can also be attained in which the balloon 107 with the message is displayed as described below.

In the map zoom screen 102, since the zoom (map) scale is large enough so that the cursor marker 87 is able to specify the street or the POI (point of interest) icons 103, the balloon 107 appears in the screen. In this example, since the POI icons exist within the area specified by the cursor marker 87, the balloon shows up with a message "POI ICON LIST". Typically, each POI icon indicates a category of POI (point of interest) to differentiate from other categories. Examples of such category include restaurant, bank, gas station, hotel, ATM (Automatic Teller Machine), and the like. In addition to such categories, POI icon can be individual icons prepared in the navigation system or created by the user.

Thus, when the user wants to know more about the POIs in the cursor marker 87, by pressing the enter key 62a, the navigation system moves to the brake down menu shown in the name list screen 104. Here, the name list screen 104 displays a name list 106 listing the names of the POIs specified by the cursor marker 87. In this example, the name "MOBIL" is shown when selecting the POI icon indicating the gas station. At the same time, an information box 105 shows more detailed information about the specified gas station such as an address, a phone number, a direction, and a distance from the current vehicle position. The name list 106 also includes "CURSOR POINT" as a menu bar. By selecting this menu bar, the information box 105 shows the address of the location on the street specified by the cursor marker 87.

If the highlighted POI in the name list screen 104 is the destination where the driver wants to go, by pressing the enter key 62a, the system displays the confirmation screen 108 which includes an information box 109. In this example, the information box 109 shows the name, address, and phone number of the selected POI. By selecting "OK TO PROCEED", the navigation system calculates the appropriate route to the destination, thereby moving to the route guidance screen such as shown in FIG. 1B.

FIGS. 12A and 12B show a further example of display images in the navigation system of the present invention which is operated by the simplified control keys of FIG. 4. This example shows a situation where the POI icons are displayed on the locator map screen, map scroll screen and map zoom screen when each of such screens is set to a map scale which is larger than the predetermined level. For example, through a setup menu, the navigation system is set so that such POI icons will be displayed when the map scale is ⅛ miles per ruler or larger. Other than displaying the POI icons, the operation in the example of FIG. 12 is basically the same as those described with reference to FIGS. 10A, 10B and 11.

In this example, a locator map screen 110 includes POI icons 103 on the map image because the map scale is large enough to display the POI icons in an identifiable manner. If the map scale is not large enough, too many POI icons may be displayed on the screen, especially in a crowded city, in a manner impossible to specify a POI icon interested from the other POI icons. Further, when too many POI icons are displayed, the map image may become no longer discernible for the driver. Thus, it is preferable that the POI icons are displayed only when the map scale is larger than the predetermined level.

In FIG. 12A, similar to the example of FIG. 9, if the enter key 62a is pressed at the locator map screen 110, the system displays a map zoom screen 112. As in the foregoing, the zoom scale in the map zoom screen 112 is adjusted by operating the right or left cursor keys 62b. At the locator map screen 110, if the cursor keys 62b are operated, the system displays the cursor marker 87 at the center of the map scroll screen 114 and scrolls the map image in up, down, right and left directions. In the map scroll screen 114, by pressing the enter key 62a again, the system changes to a map zoom screen 116 in a manner similar to the foregoing examples. By operating the cursor key 62b in right or left, the zoom scale is adjusted in a map zoom screen 118.

If the map scale is large enough in the map zoom screen 116 to display an enlarged view around the cursor marker 87, a balloon 117 with a message will be displayed corresponding to the area specified by the cursor marker 87. The balloon 117 is to assist the user to further proceed for finding a destination or other information by displaying a name list screen 120 or 122 as in FIG. 12B. An example of message indicated by the balloon includes "POI ICON LIST" when the POI icon exists in an area specified by the cursor marker 87, or an address of the street or name of the street specified by cursor marker 87, or "NO DIGITIZED ROAD EXISTS IN THIS AREA" when no POI icon or street exists in the area specified by the cursor marker 87.

In the map zoom screen 116 of FIG. 12A, since the zoom (map) scale is large enough so that the cursor marker 87 is able to specify the street or the POI icons 103. Thus, in this example, since the POI icons exist within the area specified by the cursor marker 87, the balloon 117 shows up with the message "POI ICON LIST". Thus, by pressing the enter key 62a, the navigation system moves to a name list screen such as screen 120 or 122 shown in FIG. 12B. Here, the name list screens 120 and 122 show a name list 121 of the POIs in the area specified by the cursor marker 87.

In the name list screen 120, when "CURSOR POINT" is selected, the information box 123 shows an address of the street or a name of the street specified by the cursor marker 87. In the name list screen 122, the name "MOBIL" is selected which is shown in the name list along with the POI icon indicating the gas station. At the same time, the information box 123 shows the address and phone number of the selected POI, as well as the direction and distance to the selected POI from the current vehicle position.

If the highlighted POI in the name list screen 120 or 122 is the destination where the driver wants to go, by pressing the enter key 62a, the system displays the confirmation screen 124 which includes an information box 125. In this example, the information box 125 shows the name, address, and phone number of the selected POI or the address or name of the selected street. By selecting "OK TO PROCEED", the navigation system calculates the appropriate route to the destination, thereby moving to the route guidance screen such as shown in FIG. 1B.

Figure 13:
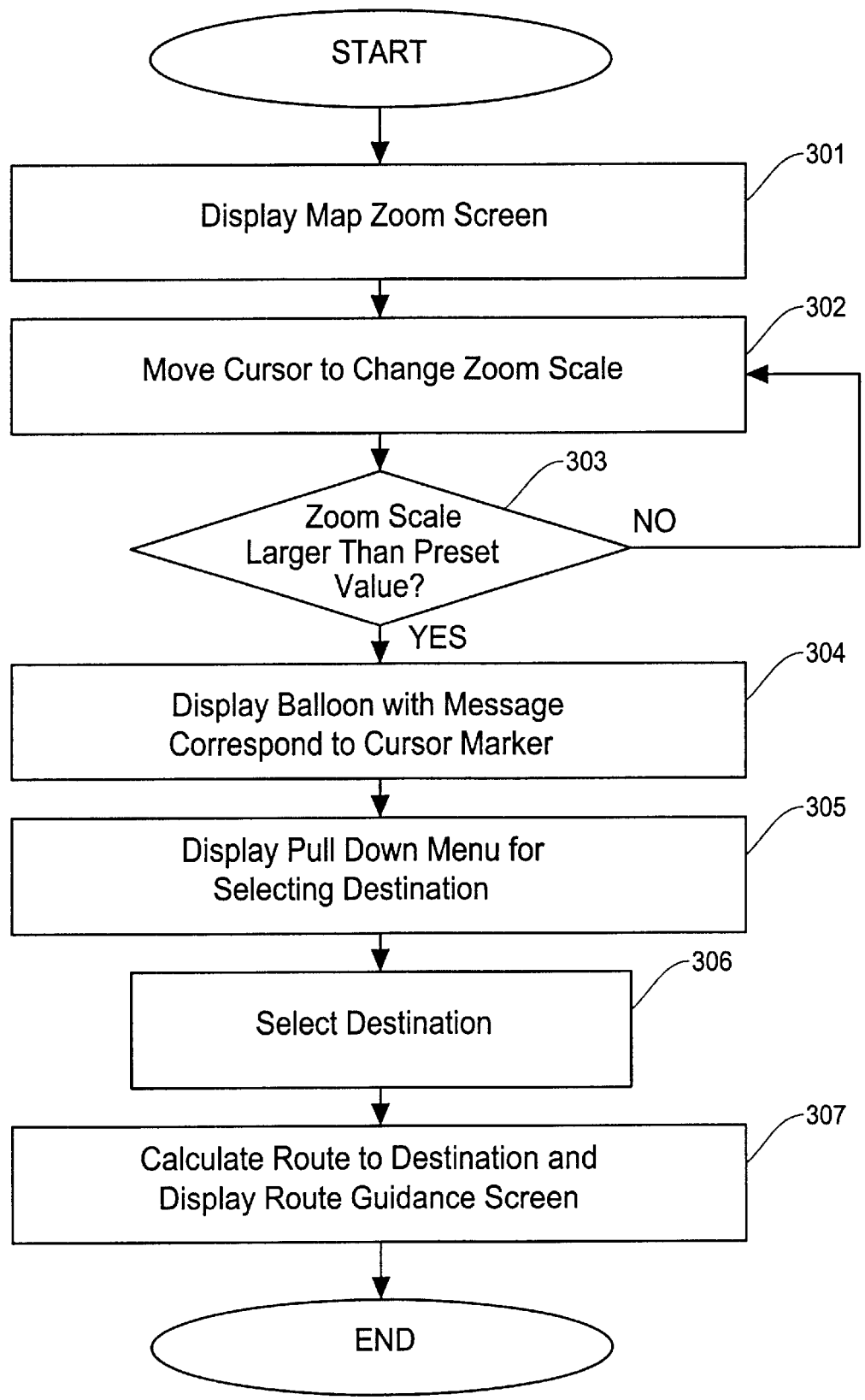
FIG. 13 is a flow chart showing an example of operational flow in the navigation system of the present invention involving the process of finding and selecting a destination.

FIG. 13 is a flow chart summarizing the operation of the navigation system of the present invention for selecting the destination through the map zoom screens and brake down menu screens. This operation is directed to the processes in FIGS. 10–12 in which the destination is determined by zooming the map image and selecting the name or address in the brake down menu. At step 301, by pressing the enter key 62a, the navigation system displays the map zoom screen. The map zoom screen shows the zoom scale bar which is moved by the operation of the cursor keys 62b. Thus, the zoom scale is changed by moving the cursor keys 62b at step 302.

In step 303, it is determined whether the zoom (map) scale is larger than the predetermined value. If the zoom scale is large enough, the system displays a balloon in the map zoom screen at step 304 in which the balloon shows a message corresponding to the cursor marker. When the zoom scale is smaller than the predetermined value, the process goes back to step 302 to further change the zoom scale. If the user's purpose is to monitor the wider area of the map image, he/she may decrease the map (zoom) scale and press the enter key 62a to go back to the locator map screen.

At step 304, if the user wants to specify the destination or change the destination, he/she presses the enter key 62a so that the brake down menu such as the name list screen is displayed at step 305. Thus, the user selects the destination at step 306 which is confirmed by the navigation system and the route to the destination is examined in step 307. Then, the navigation system displays the route guidance screen such as shown in FIG. 1B for guiding the user to the destination.

Figure 14A:
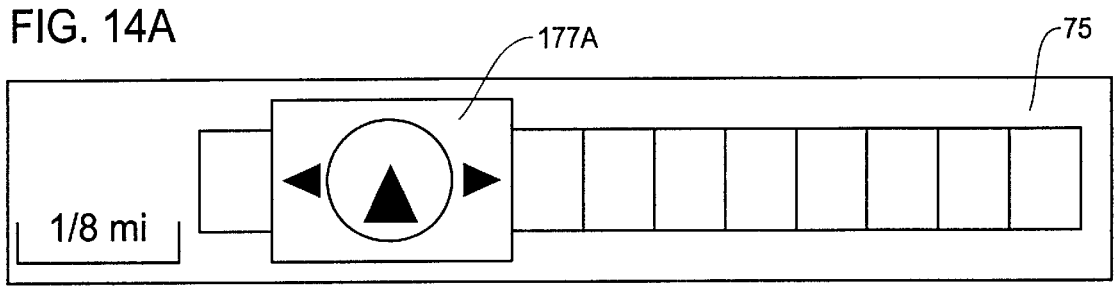
FIGS. 14A and 14B are schematic diagrams showing further examples of image of zoom scale bar displayed on the map zoom screen in the present invention.
Figure 14B:
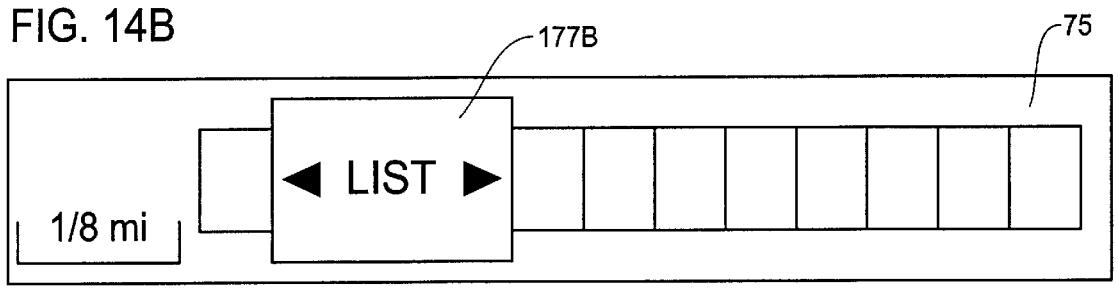

FIGS. 14A and 14B show further examples of zoom scale bar displayed on the map zoom screen in the navigation system of the present invention. Similar to the example of FIGS. 9A–9C, in this example, the zoom scale bar 75 has about ten steps of different zoom scale which are larger in the left and smaller in the right. In the example of FIG. 14A. the difference from the example of FIGS. 9A–9C is that a slider $177_A$ has an icon (mark) which is the same as that showing the vehicle current position. Thus, by pressing the enter key 62a, the navigation system goes to the locator map screen in which the vehicle current position is shown on the screen. The icon of FIG. 14A will be displayed when the slider $177_A$ is positioned in a relatively large zoom scale such as between 1/20 miles and 2 miles per ruler.

In the example of FIG. 14B, a slider $177_B$ shows a mark "LIST" which may be an alternative of the balloon mark of the slider 77A of FIG. 9A. The mark "LIST" on the slider $177_B$ may also be used along with the balloon mark on the slider 77A. The mark "LIST" indicates that by pressing the enter key 62a, the system will display a name list of POIs in the area specified by the cursor marker.

Figure 15B:
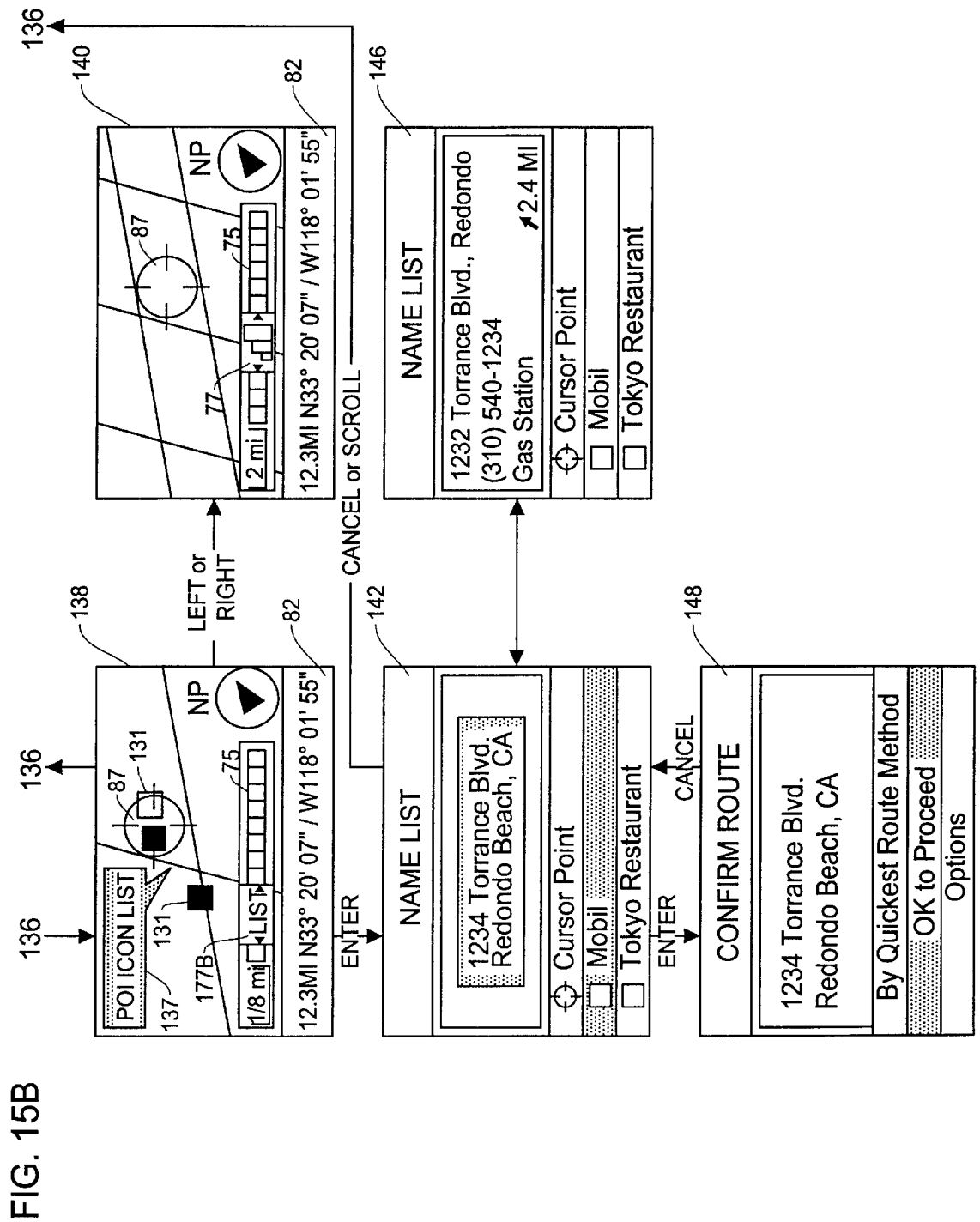

FIGS. 15A and 15B show an example of display images in the navigation system of the present invention wherein the examples of zoom bar of FIGS. 14A and 14B are used. This example is similar to the case shown in FIGS. 12A and 12B where POI icons are shown in the screens. In a locator map screen 130, by pressing the enter key 62a, the system moves to a map zoom screen 132. In this example, the map zoom screen 132 includes a zoom scale bar 75 having a slider $177_A$ which shows the vehicle position mark as described with reference to FIG. 14A. This means that by pressing the enter key 62a without operating the cursor keys 62b, the display goes back to the locator map screen 130 showing the vehicle current position.

At the locator map screen 130 in FIG. 15A, by operating the cursor keys 62b in up, down, right and left, the map image scrolls in a map scroll screen 136. A cursor marker 87 is displayed at the center of the screen while the map image moves in the directions corresponding to the cursor keys 62b. When the enter key 62a is pressed, the display changes to a map zoom screen 138. If the zoom (map) scale is large enough either because the previous screen 136 has a map scale larger than the predetermined level or by the operation of the cursor keys 62b, the map zoom screen displays a balloon 137 with a predetermined message. If the zoom scale is decreased to show a wider area as in a map zoom screen 140, the POI icons will disappear from the screen.

In the map screen 138 in FIG. 15B, since the POI icons exist in the area specified by the cursor marker 87, the balloon 137 shows the message "POI ICON LIST". In this example, a slider $177_B$ in the zoom scale bar 75 shows the mark "LIST" indicating that the name list will be displayed when pressing the enter key. Thus, in FIG. 15B, by pressing the enter key 62a, the system displays a name list screen 142 or 146 and a confirmation screen 148 as in the same manner described in the foregoing examples.

Figure 16:
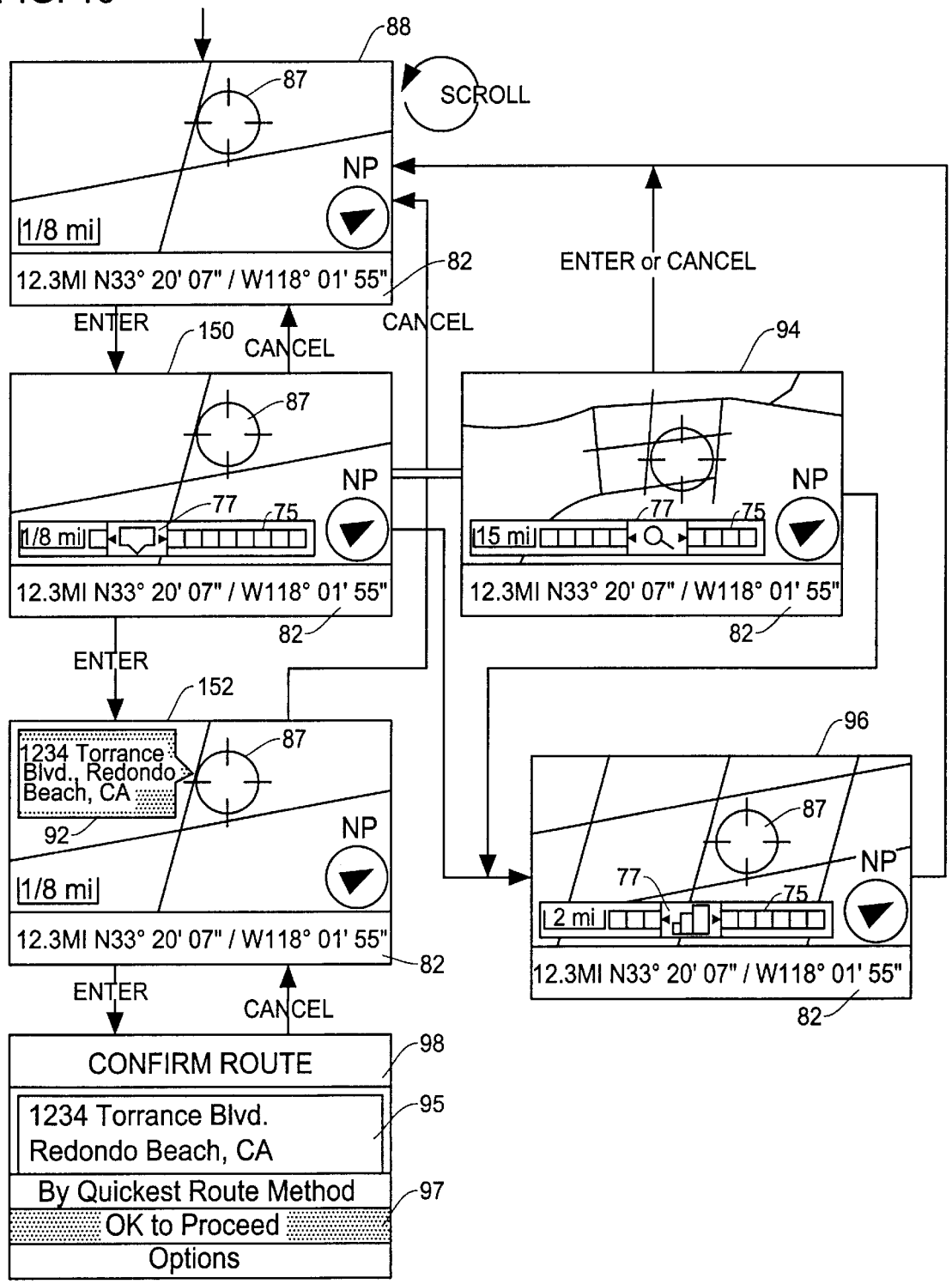
FIG. 16 is a schematic diagram showing a further example of display images in the navigation system of the present invention in which the operation is controlled by the control key arrangement of FIG. 4.

FIG. 16 shows an example of display images in the navigation system of the present invention which is a modified version of the example of FIG. 10. In the example of FIG. 10, when the zoom (map) scale is large enough in the map zoom screen 90, the zoom scale 75 with the slider 77 showing the balloon icon as well as the balloon 92 are displayed at the same time. In the example of FIG. 16, this step is divided into two steps, i.e., a map zoom screen 150 showing the zoom scale bar 75 with the slider 77 showing the balloon icon and a separate screen 152 with the balloon 92 showing the associated message.

Namely, by pressing the enter key 62a in the map scroll screen 88, the system goes to the map zoom screen 150 or 94 depending on the map scale in the screen 88. When the map (zoom) scale is large enough, either by controlling the cursor keys 62b or because the map scale in the map scroll screen 88 was larger than the predetermined size, the slider 77 on the zoom scale 75 indicates the balloon icon in the map zoom screen 150. This means that the next operation of the enter key 62a will display a message in the balloon format. Thus, by pressing the enter key 62a, the system displays the screen 152 which includes the balloon 92 showing an address or street name of the location specified by the cursor marker or the availability of POI list.

FIG. 17 shows a further example of displayed images in the navigation system of the present invention incorporating the simplified key arrangement such as shown in FIG. 4. In this example, an initial setting of the zoom scale is classified into three different levels rather than two levels such as shown in the previous examples. A locator map screen 160, map zoom screens 162, 164 and a map scroll screen 166 are basically the same as that shown in the examples of FIGS. 10A and 10B. Namely, in the locator map screen 160, by pressing the enter key 62a, the system moves to the map zoom screen 162. The zoom scale is changed by operating the cursor keys 62b in right or left direction in the map zoom screen 164. Thus, the size of the map image and the position of the slider 77 on the zoom scale bar 75 are adjusted in response to the cursor key operation.

At the locator map screen 160, by operating the cursor keys 62b in up, down, right and left, the map image scrolls in the map scroll screen 166. During the map scroll, the cursor marker 87 stays at the center of the screen while the map image moves in the directions corresponding to the operation of the cursor keys 62b. In the map scroll screen 166, when the enter key 62a is pressed, the navigation system changes to a map zoom screen 168, 170 or 172 depending on the level of map scale in the map scroll screen 166 with reference to predetermined threshold levels, such as large and intermediate threshold levels.

If the map scale is larger than the large threshold level, the system displays the map zoom screen 168 in the larger range of zoom scale. If the map scale is smaller than the large threshold level but larger than the intermediate threshold level, the system displays the map zoom screen 170 in the intermediate range of zoom scale. If the map scale is smaller than the intermediate threshold level, the system displays the map zoom screen 172 in the smaller range of zoom scale.

In any map zoom screen, the zoom scale can be freely changed by operating the cursor key 62b in right or left. However, suppose the user presses the enter key 62a or cancel key 62c before using any cursor key 62b, the system goes back to the map scroll screen 166. Basically, when the cancel key 62c is pressed, the system goes back to the map scroll screen with the same map scale immediately prior to the current screen. However, when the enter key is pressed, the system goes back to the map scroll screen which may have a map scale different from the zoom scale of the current screen. For example, the map zoom screen 170 in the intermediate range scale goes back to the map scroll screen with the larger range map screen, and the map zoom screen 172 in the smaller range scale goes back to the map scroll screen with the intermediate range map screen.

When the zoom scale is in the large range, for example, ⅛ or 1/20 miles per ruler, such as in the screen 168, the slider 77 on the zoom scale 75 displays the balloon icon. Thus, by pressing the enter key 62a, the system displays the balloon with the associated message. As shown by the various examples in the foregoing, the example of message in the balloon is the address of street specified by the cursor marker or the announcement of the POI name list. In either the map zoom screen 168, 170 or 172, the zoom scale is controlled by operating the cursor keys 62b in right or left. When operating the cursor keys 62b, the slider 77 shows the icons such as shown in FIGS. 9A–9C and slides along the zoom scale 75 while changing the zoom scale. After changing the zoom scale, the map scale is selected and fixed in the locator map screen by the operation of the enter key 62a.

If the user wants to set a new destination or to see the name and address information of a specific POI or the like, the user presses the enter key 62a in the screen showing the balloon. Then the navigation system displays the brake down menu screen shown in the foregoing examples to guide the user to confirm the name and address information or specify the destination for the navigation system.

Figure 18A:
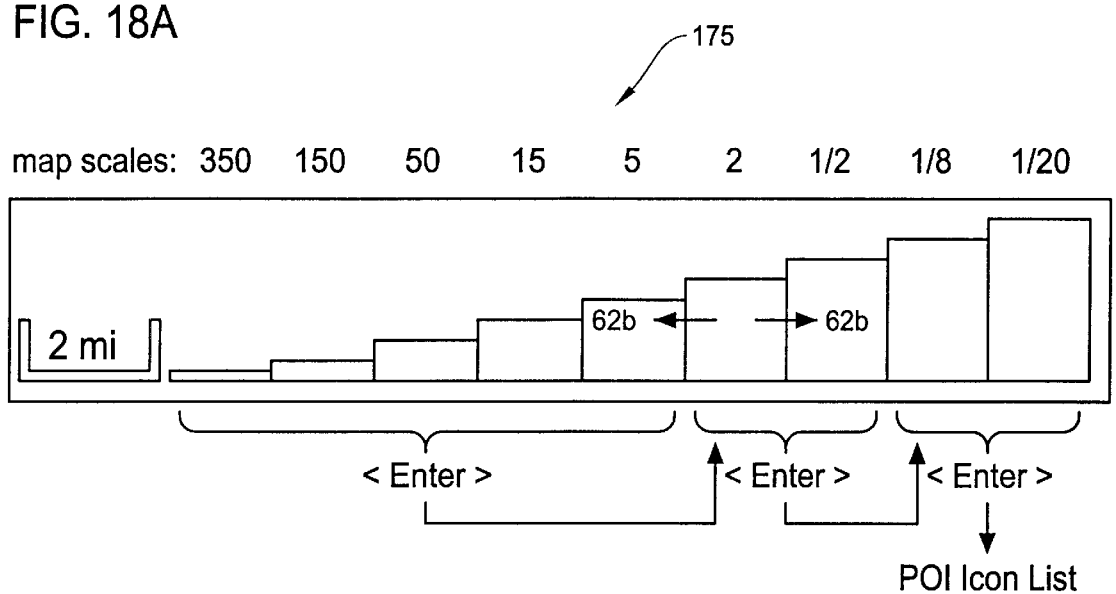
FIGS. 18A and 18B are schematic diagrams showing a further example of image of zoom scale bar displayed on the map zoom screen in the present invention.
Figure 18B:
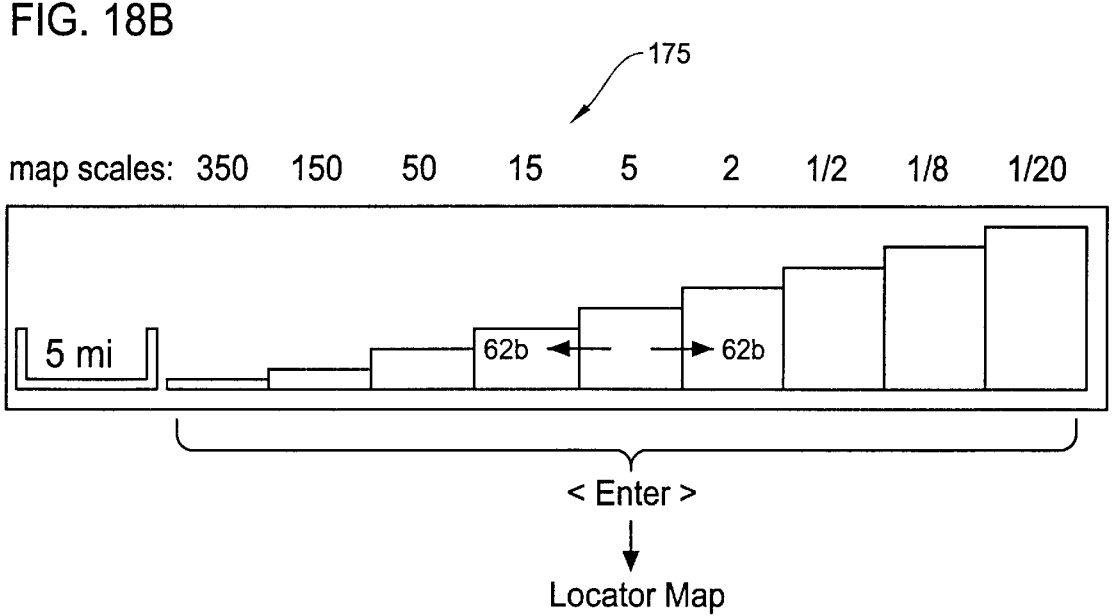

FIGS. 18A and 18B show a further example of images of zoom scale bar 175 displayed on the map zoom screen in the present invention. In this example, the map scale is increased (map image is enlarged) toward the right direction of the scale bar 175 and is decreased toward the left direction. An example of map scale is shown in FIGS. 18A and 18B wherein the small zoom range includes 350, 150, 50, 15, and 5 miles per ruler, the intermediate zoom range includes 2 and ½ miles per ruler, and the large zoom range includes ⅛ and 1/20 miles per ruler. The current zoom scale is highlighted on the zoom scale bar 175 as well as the numeral reading of the zoom scale is displayed at the left end thereof with an image of ruler.

As noted above, in the map zoom screen 168, 170 or 172 of FIG. 17, by pressing the enter key 62a before changing the zoom scale, the system goes back to the map scroll screen 166 with the map scale determined by the zoom scale in the map zoom screen. FIG. 18A shows such a situation where the enter key 62a is activated before operating the cursor key 62b. In this example, when the zoom scale screen is in the small zoom scale range, the system sets the map scroll screen with the map scale of 2 miles per ruler in the intermediate zoom scale range in response to the action of the enter key. However, when the zoom scale screen is in the intermediate zoom scale range, the system sets the map scroll screen with the map scale of ⅛ miles per ruler in the large zoom scale range in response to the action of the enter key.

However, after operating the cursor key 62b for selecting the zoom scale, the next enter key operation sets the selected zoom (map) scale in the map scroll screen. Thus, in the example of FIG. 18B, once the zoom scale is changed, the system sets the locator map screen with the map scale selected by the cursor key 62b in the map zoom screen in response to the action of the enter key.

Figure 19:
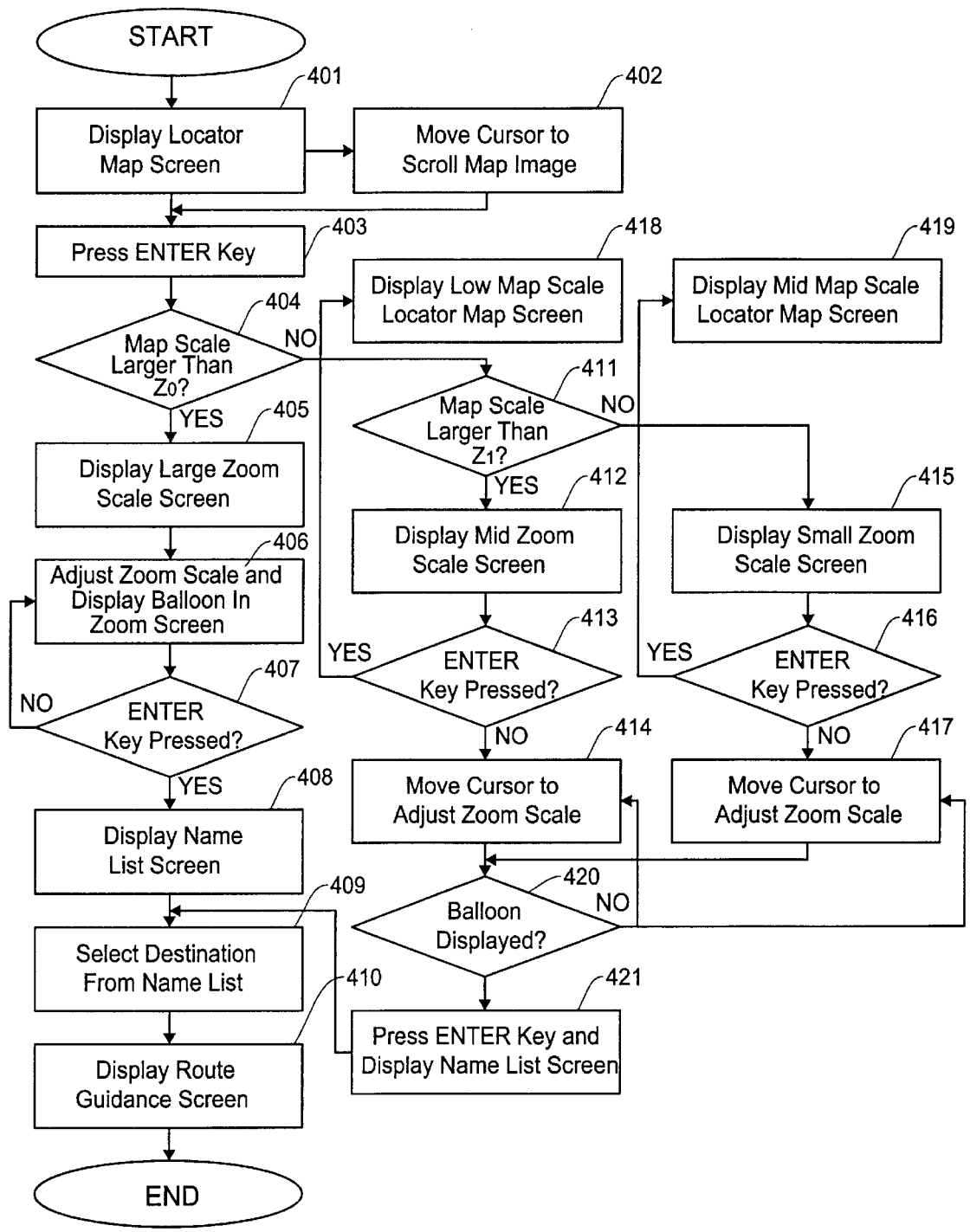
FIG. 19 is a flow chart showing the operation in the navigation system of the present invention where the initial setting of zoom size is classified into three different levels depending on the map scale in the map screen.

FIG. 19 is a flow chart showing an operational flow in the navigation system of the present invention using the key arrangement of FIG. 4 where the initial setting of the zoom size is classified into three sizes as in the examples of FIGS. 17 and 18. As noted above, the additional role of the enter key 62a is to switch between the map mode (locator map screen or map scroll screen) and the zoom mode. Further, the additional function of the cursor keys 62 is to increase or decrease the map (zoom) scale.

In FIG. 19, when the navigation system is in the locator map mode at step 401, the cursor keys (scroll means) 62b of FIG. 4 work as map scroll keys. Thus, at step 402, by moving the cursor keys 62b, the displayed map image is scrolled in up, down, right and left directions (map scroll screen). Typically, as shown in the foregoing examples, the cursor marker 87 stays on the screen while the map image scrolls in response to the cursor keys 62b.

If the user operates the enter key 62a in step 403 either at the locator map screen or map scroll screen, the navigation system is switched to the zoom mode. An initial zoom size in the map zoom screen is determined by the map scale in the locator map screen in the step 401 or the map scroll screen in the step 402. In this example, the navigation system is preset to three ranges of zoom scale, i.e., a large range, an intermediate range, and a small range. Such different ranges are determined by comparing the predetermined threshold values of map (zoom) scale. As described with reference to FIGS. 18A and 18B, an example of such ranges will be so preset that the small zoom scale range includes 350, 150, 50, 15, and 5 miles per ruler, the intermediate zoom scale range includes 2 and ½ miles per ruler, and the large zoom scale range includes ⅛ and ¹⁄₂₀ miles per ruler.

Namely, at step 204, it is determined whether the map scale before pressing the enter key (step 403) is larger than the predetermined large threshold value $Z_o$. When it is larger than the low threshold value $Z_o$, at step 405, the navigation system displays a map zoom screen in the large zoom scale range. If the map scale is smaller than the large threshold value $Z_o$, at step 411, it is determined whether the map scale before pressing the enter key (step 403) is larger than the predetermined intermediate threshold value $Z_1$. When it is larger than the intermediate threshold value $Z_1$, at step 412, the navigation system displays a map zoom screen in the intermediate zoom scale range. If the map scale is smaller than the intermediate threshold value $Z_1$ at step 411, the navigation system displays a map zoom screen in the small zoom scale range.

In the large zoom scale screen at step 405, the balloons with associated massages will appear on the screen. The user may further adjust the zoom scale at step 406 to find, for example, a desired POI icon in the cursor marker. In step 407, the navigation system determines whether the enter key 62a is pressed by the user. If the enter key 62a is pressed, the system displays the name list screen which shows a list of names of the POI icons in the area specified by the cursor marker such as in the screen 142 of FIG. 15B. The user may select a desired destination by changing the highlight on the name list screen.

In the intermediate zoom scale screen, at step 413, it is determined whether the enter key 62a is pressed before operating the cursor keys 62b, i.e., before changing the zoom scale. If the enter key 62a is pressed before changing the zoom scale, the system goes back to the locator map screen at step 418 wherein the map scale is zoomed in to a large map scale such as ⅛ miles per ruler. Similarly, in the small zoom scale screen, at step 416, it is determined whether the enter key 62a is pressed before operating the cursor keys 62b, i.e., before changing the zoom scale. If the enter key 62a is pressed before changing the zoom scale, the system goes back to the locator map screen at step 419 wherein the map scale is zoomed in to an intermediate map scale such as 2 miles per ruler.

However, in step 413, if the cursor keys 62b are used in either the step 413 or 416 before pressing the enter key 62a, the zoom size is changed at either step 414 or 417 in response to the right or left operation of the cursor keys 62b. After that, if the enter key is pressed, the zoom (map) scale is fixed and the system moves to the locator map screen with the new map (zoom). In step 414 or 417, when adjusting the zoom scale, the zoom scale may become large enough to display the balloon such as shown in the foregoing examples. Such a situation is examined at step 420 wherein the system determines whether the balloon with associated message is displayed.

When the balloon is displayed, by pressing the enter key 62a at step 421, the name list screen is displayed. If the user wants to specify the destination or change the destination, he/she selects the desired name in the name list at step 409. The selected destination is confirmed by the navigation system and the route to the destination is examined. Then, the navigation system displays the route guidance screen such as shown in FIG. 1B at step 410 for guiding the user to the destination.

As has been described, according to the present invention, the display method and apparatus for vehicle navigation system enables the driver to operate the navigation system with use of a reduced number of control keys without adversely affecting the safe driving of the vehicle. Since the number and type of control keys are reduced, the driver is able to operate the navigation system easily and quickly. Further, the arrangement of control keys is simplified, the driver can driver the car safely without being distracted by operating the navigation system. Since the control key arrangement in the navigation system is simplified, the space required for the panel of the navigation system can be reduced.

Although the invention is described herein with reference to the preferred embodiments, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method of a navigation system, comprising the following steps of:
    displaying a map screen in which a map image is scrolled by operation of scroll means;
    changing the map screen to a map zoom screen by operating a selection key in which a zoom scale of the map image is changed by operation of the scroll means and a cursor marker is displayed at a predetermined position on the map screen; and
    returning to he map screen from the map zoom screen by operating the selection key, thereby changing between the map screen and the map zoom screen is conducted by operating only the selection key;
    wherein a zoom scale indicator is displayed on the map zoom screen to show a degree of zoom scale, and wherein the zoom scale indicator is disappeared in the map screen, and wherein adjustment of the zoom scale in the map zoom screen and the scroll of the map image are conducted by operating only the scroll means.

2. A display method of a navigation system as defined in claim 1, wherein the map screen includes a locator map screen in which a current user position is shown on the map image and a map scroll screen in which the cursor marker stays on a predetermined position on the screen while the map image is scrolled in predetermined directions by operation of the scroll means.

3. A display method of a navigation system as defined in claim 1, wherein a map scale of the map screen is determined by the zoom scale in the map zoom screen prior to the map screen, and wherein the map screen includes a locator map screen in which a current user position is shown on the map image and a map scroll screen in which the cursor marker stays on a predetermined position on the screen while the map image is scrolled in predetermined directions by operation of the scroll means.

4. A display method of a navigation system as defined in claim 3, wherein the map scale in the map screen is increased from the zoom scale in the map zoom screen when the zoom scale is smaller than a predetermined scale and when the selection key is operated in the map zoom screen before operating the scroll means.

5. A display method of a navigation system as defined in claim 3, wherein the map scale in the map screen is set to be equal to the selected zoom scale when the selection key is operated in the map zoom screen after operating the scroll means for specifying the zoom scale.

6. A display method of a navigation system as defined in claim 1, wherein the map zoom screen includes a balloon image which shows a me sage associated with an area specified by the cursor marker when the zoom scale of the map image is larger than a predetermined scale.

7. A display method of a navigation system as defined in claim 6, wherein the message shown in the balloon image indicates availability of a name list corresponding to POI (point of interest) icons in the area specified by cursor marker in a name list screen that will e displayed when operating the selection key.

8. A display method of a navigation system as defined in claim 6, wherein the message shown in the balloon image indicates an address or a street name of a location specified by the cursor marker.

9. A display me hod of a navigation system as defined in claim 1, wherein the map screen and the map zoom screen include POI (point of interest) icons each indicating a POI location, wherein the POI icons are displayed when a map scale in the map screen or the zoom scale in the map zoom screen is larger than a predetermined scale.

10. A display method of a navigation system as defined in claim 1, wherein the zoom scale indicator in the map zoom screen includes a zoom slider which moves in a predetermined direction on the zoom scale indicator in response to the operation of the scroll means.

11. A display method of a navigation system as defined in claim 1, wherein the zoom scale indicator in the map zoom screen includes balloon icons in a large scale range, thereby indicating that, when operating the selection key to go back to the map screen and again coming back to the map zoom screen, the display will show a balloon indicating that the selection key will act upon the message displayed in the balloon.

12. A display me hod of a navigation system as defined in claim 1, wherein the zoom scale indicator in the map zoom screen includes a zoom slider high moves in a predetermined direction on zoom scale indicator in response to the operation of the scroll means and changes an icon thereon depending on the position on the zoom scale indicator or conditions of the zoom slider wherein the icon on the zoom slider indicates a type of next screen that will be displayed when operating the selection key.

13. A display method of a navigation system as defined in claim 12, herein the icon on the zoom slider is a balloon icon when the zoom slider is at a position on the zoom scale indicator indicating a zoom scale larger than a predetermined scale, wherein the ball on icon on the zoom slider indicates that the selection key will act upon the message displayed in the balloon.

14. A display method of a navigation system as defined in claim 12, wherein the icon on the zoom slider is a zoom-in icon when the zoom slider is at a position on the zoom scale indicator indicating a zoom scale smaller than a predetermined scale, wherein the zoom-in icon on the zoom slider indicates that a map screen with a map scale increased from the zoom scale in the map zoom screen will be displayed when operating the selection key.

15. A display method of a navigation system as defined in claim 12, wherein the icon on the zoom slider is a zoom scale icon when the zoom slider is moved in response to the operation of the scroll means, wherein the zoom scale icon indicates that the zoom scale in the map zoom screen is changed from an initial zoom scale set at the start of the map zoom screen.

16. A display method of a navigation system as defined in claim 12, wherein the icon on the zoom slider is a current user position icon indicating that the map zoom screen is changed to a locator ma screen showing the current user position when operating the selection key.

17. A display method of a navigation system as defined in claim 12, wherein the icon on the zoom slider is a name list mark when the zoom slider is at a position on the zoom scale indicator indicating a zoom scale larger than a predetermined scale, wherein the name list mark on the zoom slider indicates that a name list screen will be displayed when operating the selection key.

18. A display method of a navigation system as defined in claim 17, wherein the name list screen displays a list of names and addresses of places and a position of the cursor marker, and wherein a destination is selected through the name list screen and a route to the selected destination is determined by the navigation system.

19. A display method of a navigation system as defined in claim 1, wherein a map scale of the map screen is determined by the zoom scale in the map zoom screen when the selection key is operated in the map zoom screen before operating the scroll means, and wherein the map scale in the map screen is increased or decreased based on the results of comparing the zoom scale with one or more threshold scales.

20. A display method of a navigation system as defined in claim 1, wherein a map scale of the map screen is determined by the zoom scale in the map zoom screen when the selection key is operated in the map zoom screen before operating the scroll means, and herein the map scale in the map screen is increased when the zoom scale is smaller than a predetermined threshold scale, and wherein the map scale in the map screen is decreased when the zoom scale is larger than the predetermined threshold scale.

21. A display method of a navigation system as defined in claim 1, wherein a map scale of the map screen is determined by the zoom scale in the map zoom screen when the selection key is operated in the map zoom screen before operating the scroll means, and wherein the map scale in the map screen is increased to one of large map scales when the zoom scale is smaller than a predetermined large threshold scale but is larger than a predetermined middle threshold scale, and wherein the map scale in the map screen is increased to one of middle map scales when the zoom scale is smaller than the predetermined middle threshold scale.

22. A display method of a navigation system as defined in claim 1, wherein an initial zoom scale in the map zoom screen when the display is switched from the map screen to the map zoom screen is determined by a map scale in the map screen when the selection key is operated in the map screen, and wherein the initial zoom scale is set to one of large zoom scales when the map scale is larger than a predetermined large threshold scale, and the initial zoom scale is set to one of middle zoom scales when the map scale is smaller than the predetermined large threshold level but is larger than a predetermined middle threshold scale, and the initial zoom scale is set to one of small zoom scales when the map scale is smaller than the predetermined middle threshold scale.

23. A display method of a navigation system, comprising the following steps of:
displaying a locator map screen in which a current user position is shown on a map image;
changing the locator map screen to a map scroll screen by operating scroll and in which a map image is scrolled in predetermined directions in response to the operation of the scroll means while a cursor marker is displayed at a predetermined position on the map scroll screen;
changing either from the locator map screen or the map scroll screen to a map zoom screen by operating a selection key in which a zoom scale of the map image is changed by operation of the scroll means and the cursor marker or a user position marker is displayed at a predetermined position on the map zoom screen; and
selecting the zoom scale by operating the selection key after adjusting the zoom scale by operating the scroll means in the map zoom screen, thereby returning to the locator map screen or map scroll screen ("map screen") with the selected zoom scale or moving to a name list screen in which a list of names of POI (point of interest) specified by the cursor marker or an address or street name of a location specified by the cursor marker is displayed;
wherein a zoom scale indicator is displayed on the map zoom screen to show a degree of zoom scale, and wherein the zoom scale indicator is disappeared in the map screen, and wherein switching between the map screen and the map zoom screen is conducted by operating only the selection key, and wherein adjustment of the zoom scale in the map zoom screen and the scroll of the map image are conducted by operating only the scroll means.

24. A display apparatus of a navigation system, comprising:
means for displaying a locator map screen in which a vehicle current position is shown on a map image;
means for changing the locator map screen to a map scroll screen by operating scroll means in which a map image is scrolled in response to the operation of the scroll means while a cursor marker is displayed at a predetermined position on the map scroll screen;
means for displaying a map zoom screen by operating a selection key in high a zoom scale of the map image is changed by operating of the scroll means and the cursor marker is displayed at a predetermined position on the map zoom screen; and means for returning to the locator map screen or map scroll screen ("map screen") from the map zoom screen by operating the selection key;
wherein a zoom scale indicator is displayed on the map zoom screen to show a degree of zoom scale, and wherein the zoom scale indicator is not displayed in the locator map screen or map scroll screen, and wherein switching between the map zoom screen an the map screen is conducted by operating only the selection key, and wherein adjustments of the zoom scale in the map zoom screen and the scroll of the map image are conducted by operating only the scroll means.

25. A display apparatus of a navigation system as defined in claim 24, wherein a map scale of the map screen is determined by the zoom scale in the map zoom screen.

26. A display apparatus of a navigation system as defined in claim 24, wherein the map screen (locator map screen, map scroll screen) and the map zoom screen include POI (point of interest) icons each indicating a POI location, wherein the POI icons are displayed when the map scale in the locator map screen and map scroll screen or the zoom scale in the map zoom screen is larger than a predetermined scale.

27. A display apparatus of a navigation system as defined in claim 24, wherein the map zoom screen includes a balloon image which shows a message associated with an area specified by the cursor marker when the zoom scale of the map image is larger than a predetermined scale.

28. A display apparatus of a navigation system as defined in claim 24, herein the map scale in the map screen (locator map screen or map scroll screen) is increased from the zoom scale in the map zoom screen when the zoom scale is smaller than a predetermined scale and when the selection key is operated in the map zoom screen before operating the scroll means.

29. A display apparatus of a navigation system as defined in claim 24, wherein the map scale in the map screen (locator map screen or map scroll screen) is set to be equal to the selected zoom scale when the selection key is operated in the map zoom screen after operating the scroll means for specifying the selected zoom scale.

30. A display apparatus of a navigation system as defined in claim 24, wherein the zoom scale indicator in the map zoom screen includes balloon icons in a large scale range, thereby indicating that, when operating the selection key to go back to the map screen and again coming back to the map zoom screen, the display will show a balloon indicating that the selection key will act upon the message displayed in the balloon.

31. A display apparatus of a navigation system as defined in claim 24, wherein the zoom scale indicator in the map zoom screen includes a zoom slider high moves in a predetermined direction on the zoom scale indicator in response to the operation of the scroll means and changes an icon thereon depending on the position on the zoom scale indicator or conditions of the zoom slider wherein the icon on the zoom slider indicates a type of next screen that will be displayed when operating the selection key.

32. A display apparatus of a navigation system as defined in claim 24, wherein a map scale of the map screen is determined by the zoom scale in the map zoom screen when the selection key is operated in the map zoom screen before operating the scroll means, and herein the map scale in the map screen is increased or decreased based on the results of comparing the zoom scale with one or more threshold scales.

33. A display apparatus of a navigation system as defined in claim 24, wherein a map scale of the map screen is determined by the zoom scale in the map zoom screen when the selection key is operated in the map zoom screen before operating the scroll means, and wherein the map scale in the map screen is increased when the zoom scale is smaller than a predetermined threshold scale, and wherein the map scale in the map screen is decreased when the zoom scale is larger than the predetermined threshold scale.

34. A display apparatus of a navigation system as defined in claim 24, wherein a map scale of the map screen (locator map screen or map scroll screen) is determined by the zoom scale in the map zoom screen when the selection key is operated in the map zoom screen before operating the scroll means, and wherein the map scale is increased to one of large map scales when the zoom scale is smaller than a predetermined large threshold scale but is larger than a predetermined middle threshold scale, and wherein the map scale is increased to one of middle map scales when the zoom scale is smaller than the predetermined middle threshold scale.

35. A display apparatus of a navigation system as defined in claim 24, wherein an initial zoom scale in the map zoom screen when the display is switched from the map screen to the map zoom screen is determined by a map scale in the map screen (locator map screen or map scroll screen) when the selection key is operated in the map screen, and herein the initial zoom scale is set to one of large zoom scales when the map scale is larger than a predetermined large threshold scale, and the initial zoom scale is to one of middle zoom scales when the map scale is smaller than predetermined large threshold scale but is larger than a the predetermined middle threshold scale, and the initial zoom scale is set to one of small zoom scales when the map scale is smaller than the predetermined middle threshold scale.

36. A display apparatus of a navigation system as defined in claim 24, wherein the message accompanied by the balloon image indicates availability of a name list corresponding to POI (point of interest) in he area specified by the cursor marker on a name list screen that will be displayed when operating the selection key, and wherein the name list screen displays a list of names and addresses of POI and a position of the cursor marker, and wherein a destination is selected through the name list screen and a route to the selected destination is determined by the navigation system.

* * * * *